United States Patent
Huang et al.

(10) Patent No.: US 8,519,975 B2
(45) Date of Patent: Aug. 27, 2013

(54) DETECTOR AND DETECTION METHOD FOR A CAPACITIVE TOUCHPAD TO IDENTIFY A REAL TOUCH POINT

(75) Inventors: Chun-Chung Huang, Hsinchu (TW); Tsun-Min Wang, Miaoli County (TW); Te-Sheng Chiu, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 553 days.

(21) Appl. No.: 12/819,477

(22) Filed: Jun. 21, 2010

(65) Prior Publication Data
US 2010/0328262 A1 Dec. 30, 2010

(30) Foreign Application Priority Data
Jun. 25, 2009 (TW) ................................ 98121462 A

(51) Int. Cl.
*G06F 3/045* (2006.01)
(52) U.S. Cl.
USPC .......................................... 345/174; 345/173

(58) Field of Classification Search
USPC .................................................. 345/173, 174
See application file for complete search history.

(56) References Cited

U.S. PATENT DOCUMENTS

| | | | | |
|---|---|---|---|---|
| 5,189,417 | A * | 2/1993 | Caldwell et al. | 341/26 |
| 5,659,254 | A * | 8/1997 | Matsumoto et al. | 324/678 |
| 2009/0009486 | A1 * | 1/2009 | Sato et al. | 345/174 |
| 2009/0167718 | A1 * | 7/2009 | Lee et al. | 345/174 |
| 2009/0284495 | A1 * | 11/2009 | Geaghan et al. | 345/174 |
| 2009/0309851 | A1 * | 12/2009 | Bernstein | 345/174 |
| 2010/0039405 | A1 * | 2/2010 | Chen et al. | 345/174 |
| 2012/0162129 | A1 * | 6/2012 | Krah et al. | 345/174 |

* cited by examiner

*Primary Examiner* — Latanya Bibbins
(74) *Attorney, Agent, or Firm* — Muncy, Geissler, Olds & Lowe, PLLC

(57) ABSTRACT

A two-step detection for a capacitive touchpad to identify a real touch point first detects the self capacitances from multiple capacitance sensor traces of the capacitive touchpad to identify any touch point on the capacitive touchpad and then, if multiple touch points are detected, further detects the mutual capacitance at one of the detected touch points to identify whether it is a real touch point.

14 Claims, 33 Drawing Sheets

DETECTOR AND DETECTION METHOD FOR A CAPACITIVE TOUCHPAD TO IDENTIFY A REAL TOUCH POINT

FIELD OF THE INVENTION

The present invention is related generally to capacitive touchpads and, more particularly, to a detector and method for a capacitive touchpad to identify a real touch point.

BACKGROUND OF THE INVENTION

FIG. 1 is a simplified diagram showing the layout of a conventional two-dimensional capacitive touchpad 10 which includes capacitance sensor traces TX1-TXN in X-direction and TY1-TYM in Y-direction. For such capacitive touchpad 10, conventional methods for touch point detection is to detect the self capacitance from each of the capacitance sensor traces TX1-TXN and TY1-TYM, and then the position at which the detected capacitance has the maximum variation is determined as the touch point. However, such methods can only detect a single touch point each time, but cannot be effective for multi-touch applications. For example, as shown in FIG. 2, when two fingers touch the capacitive touchpad 10 simultaneously, in addition to the real touch points 20 and 22, there will be two ghost points 24 and 26 being detected as touch points simultaneously. In further detail, when the fingers touch at the positions 20 and 22, it causes the self capacitances of the capacitance sensor traces TX1, TX2, TY1 and TY2 having peak variations simultaneously, from which four touch points (TX1, TY1), (TX2, TY1), (TX1, TY2) and (TX2, TY2) will be identified. This case makes it impossible for a capacitive touchpad 10 to properly identify the real touch points 20 and 22 from the multiple detected touch points 20-26.

Therefore, it is desired a detector and method for a capacitive touchpad to distinguish a real touch point from a ghost point.

SUMMARY OF THE INVENTION

An object of the present invention is to provide a simple detector for a capacitive touchpad to identify a real touch point.

An object of the present invention is to provide a simple method for a capacitive touchpad to identify a real touch point.

According to the present invention, it is a two-step detection for a capacitive touchpad to identify a real touch point. First, the self capacitances of multiple capacitance sensor traces of the capacitive touchpad are detected to identify any touch point, and then, if multiple touch points are detected, one of the detected touch points is further detected for the mutual capacitance at this touch point to identify whether it is a real touch point.

According to the present invention, a detector for a capacitive touchpad to identify a real touch point includes a self negative capacitance compensator for compensating the self capacitor of a detected capacitance sensor trace, a first switch connected between the self negative capacitance compensator and the detected capacitance sensor trace, a switching circuit connected to the detected capacitance sensor trace for applying one of multiple supply voltages to the detected capacitance sensor trace, a mode switching device connected to the detected capacitance sensor trace and another capacitance sensor trace which has an intersection with the detected capacitance sensor, a second switch connected between the detected capacitance sensor trace and the mode switching device, and a sensing circuit connected to the mode switching device for detecting the self capacitance of the detected capacitance sensor trace or the mutual capacitance at the intersection to generate a sense signal. In a first mode, the mode switching device connects the detected capacitance sensor trace to the sensing circuit to detect the variation of the self capacitance from the detected capacitance sensor trace, and in a second mode, the mode switching device connects the other capacitance sensor trace to the sensing circuit to detect the variation of the mutual capacitance at the intersection.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 3:
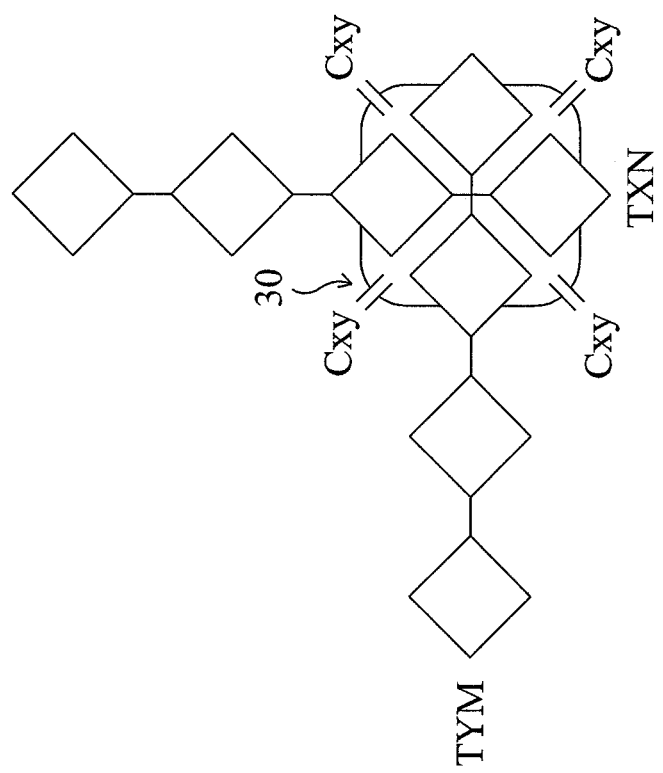
FIG. 3 is a schematic view showing two capacitance sensor traces of a capacitive touchpad that have a parasitic mutual capacitor therebetween at an intersection thereof.

For clearer illustration of the principle that the present invention is based on, FIG. 3 provides a schematic view of two capacitance sensor traces TXN and TYM of a capacitive touchpad. As is well known, at an intersection of the capacitance sensor traces TXN and TYM, there will be a parasitic mutual capacitor 30 whose capacitance is represented by Cxy. Touching at the intersection of the capacitance sensor traces TXN and TYM will cause not only variations of respective self capacitances of the capacitance sensor traces TXN and TYM, but also a variation of the mutual capacitance Cxy. Therefore, this mutual capacitance variation can be used for identifying whether the intersection of the capacitance sensor traces TXN and TYM is touched.

Figure 4:
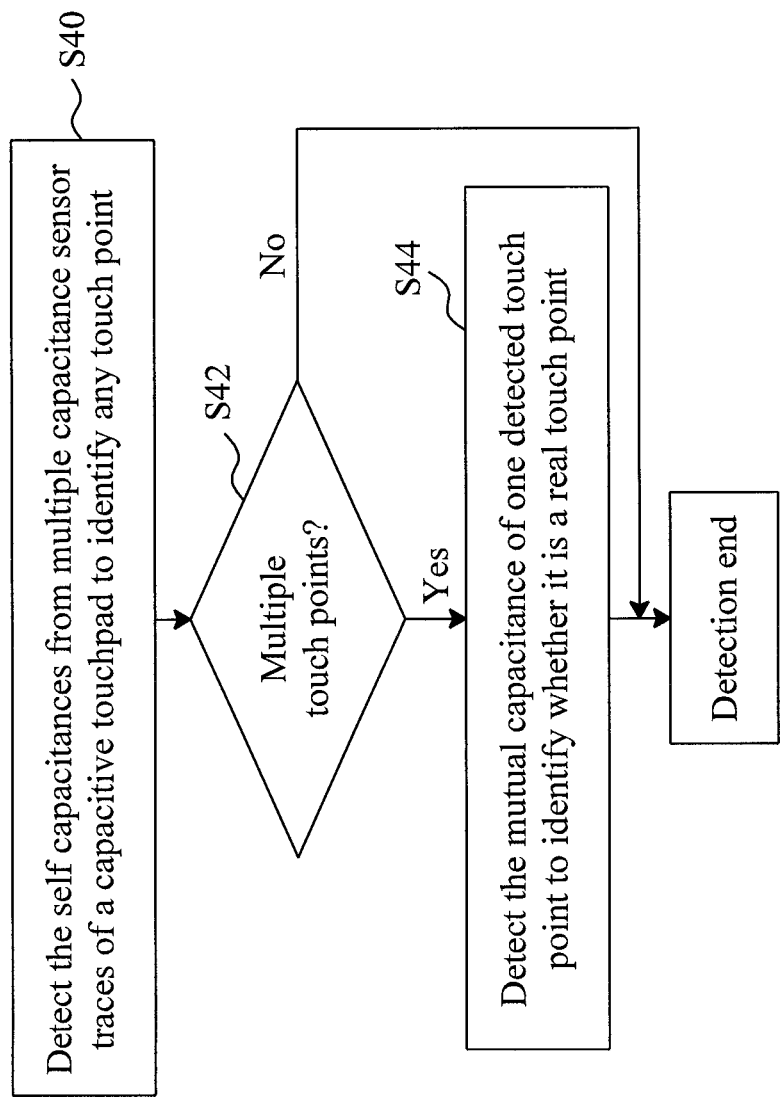
FIG. 4 is a flowchart of a detection method for a capacitive touchpad to identify a real touch point according to the present invention.

FIG. 4 is a flowchart of a detection method for a capacitive touchpad to identify a real touch point according to the present invention. Step S40 detects the self capacitances from multiple capacitance sensor traces of the capacitive touchpad to identify the touch points on the capacitive touchpad. Step S42 identifies whether multiple touch points are detected in step S40. If there is only one touch point, then the detection is ended; otherwise, the process goes to step S44 to further identify whether each of the detected touch points is a real touch point.

Figure 5:
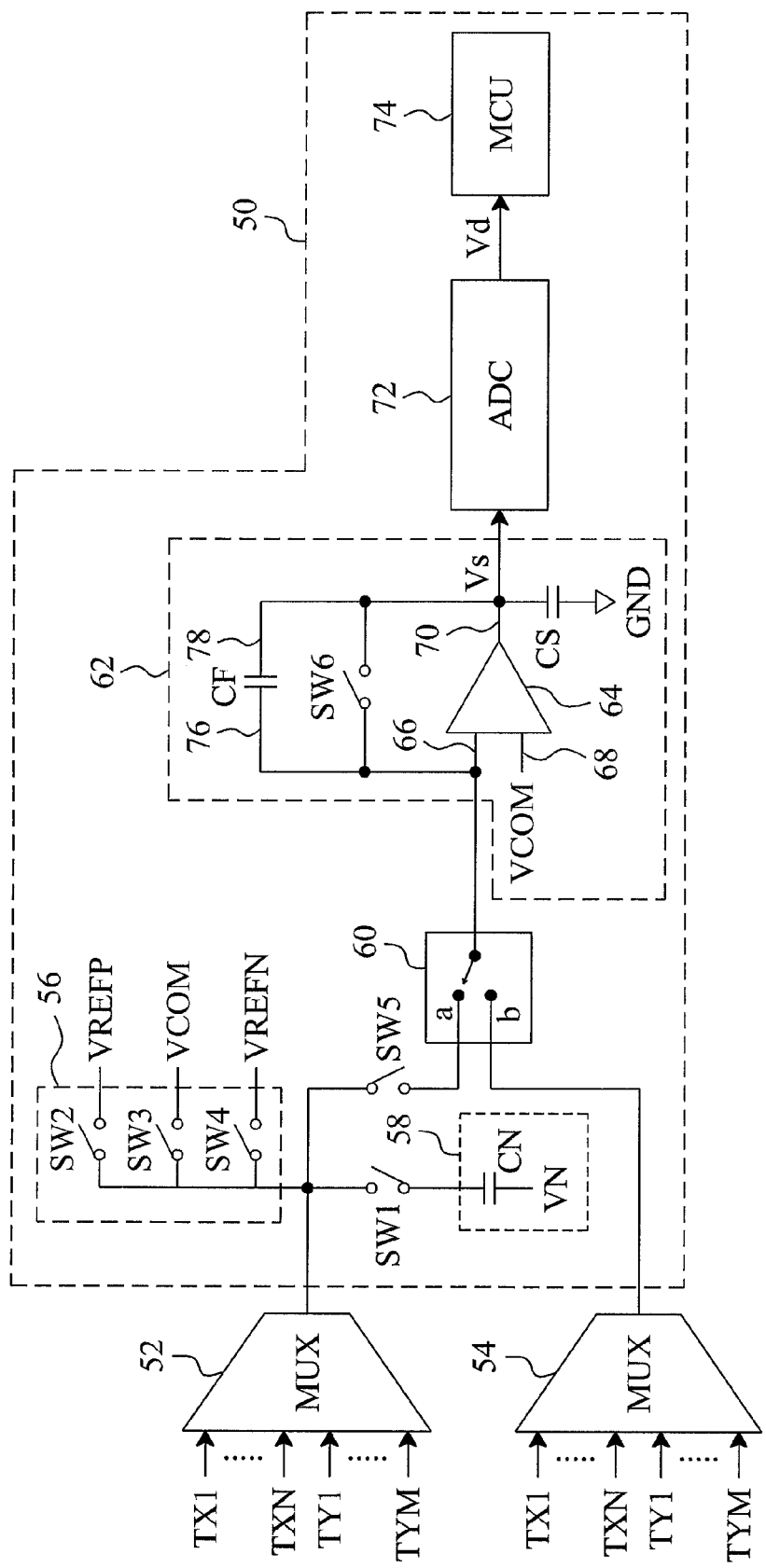
FIG. 5 is the circuit diagram of a first embodiment according to the present invention to carry out the process of FIG. 4.

FIG. 5 is the circuit diagram of a first embodiment according to the present invention to carry out the process of FIG. 4, in which a detector 50 is used to scan the capacitance sensor traces TX1-TXN and TY1-TYM of a capacitive touchpad for identifying any real touch point. Multiplexers 52 and 54 are used to select from the capacitance sensor traces TX1-TXN and TY1-TYM to connect to the detector 50 for being detected for capacitance therefrom. In the detector 50, a switching circuit 56 includes switches SW2, SW3 and SW4 connected between the output terminal of the multiplexer 52 and nodes having supply voltages VREFP, VCOM and VREFN, respectively, and is thereby controlled to apply one of the supply voltages VREFP, VCOM and VREFN to the output terminal of the multiplexer 52. A switch SW1 is further connected between the output terminal of the multiplexer 52 and a self negative capacitance compensator 58 which is used to compensate the detected capacitance sensor trace when detecting the variation of the self capacitance therefrom, to eliminate the difference in basic self capacitance between different capacitance sensor traces and thereby improve the detection. The self negative capacitance compensator 58 has a capacitor CN connected between the switch SW1 and a node having a supply voltage VN. The structure and operation of the self negative capacitance compensator 58 are well known, for example, see Taiwan Patent Application Publication No. 200905538. A switch SW5 is connected between the output terminal of the multiplexer 52 and a mode switching device 60 which is controlled to connect the output terminal of the multiplexer 52 or 54 to an input terminal of a sensing circuit 62 depending on the mode selected for the detector 50 to operate with. The sensing circuit 62 may detect the self capacitance of each of the capacitance sensor traces TX1-TXN and TY1-TYM, and the mutual capacitance at the intersection of any two capacitance sensor traces, to generate a sense signal Vs. In the sensing circuit 62, an operational amplifier 64 has two input terminals 66 and 68 connected to the mode switching device 60 and receiving a supply voltage VCOM, respectively, a switch SW6 is connected between the input terminal 66 and the output terminal 70 of the operational amplifier 64, a gain control capacitor array CF has a first terminal 76 and a second terminal 78 connected to the input terminal 66 and the output terminal 70 of the operational amplifier 64, respectively, and is configured to determine the gain of the sensing circuit 62, and a storage capacitor array CS is connected to the output terminal 70 of the operational amplifier 64 to store the sense signal Vs. An analog-to-digital converter (ADC) 72 converts the sense signal Vs from analog to digital, and the digital signal Vd is sent to a microprocessor control unit (MCU) 74 which controls the multiplexers 52 and 54, the switches SW1-SW6, and the mode switching device 60, determines the capacitances of the capacitors CN and CF, and processes the digital signal Vd to calculate the coordinates of the detected touch points. The voltage difference between the supply voltage VREFP and the supply voltage VCOM on the input terminal 68 of the operational amplifier 64, and the voltage difference between the supply voltage VREFN and the supply voltage VCOM on the input terminal 68 of the operational amplifier 64, are designed to be equal in magnitude but opposite in polarity.

Figure 6:
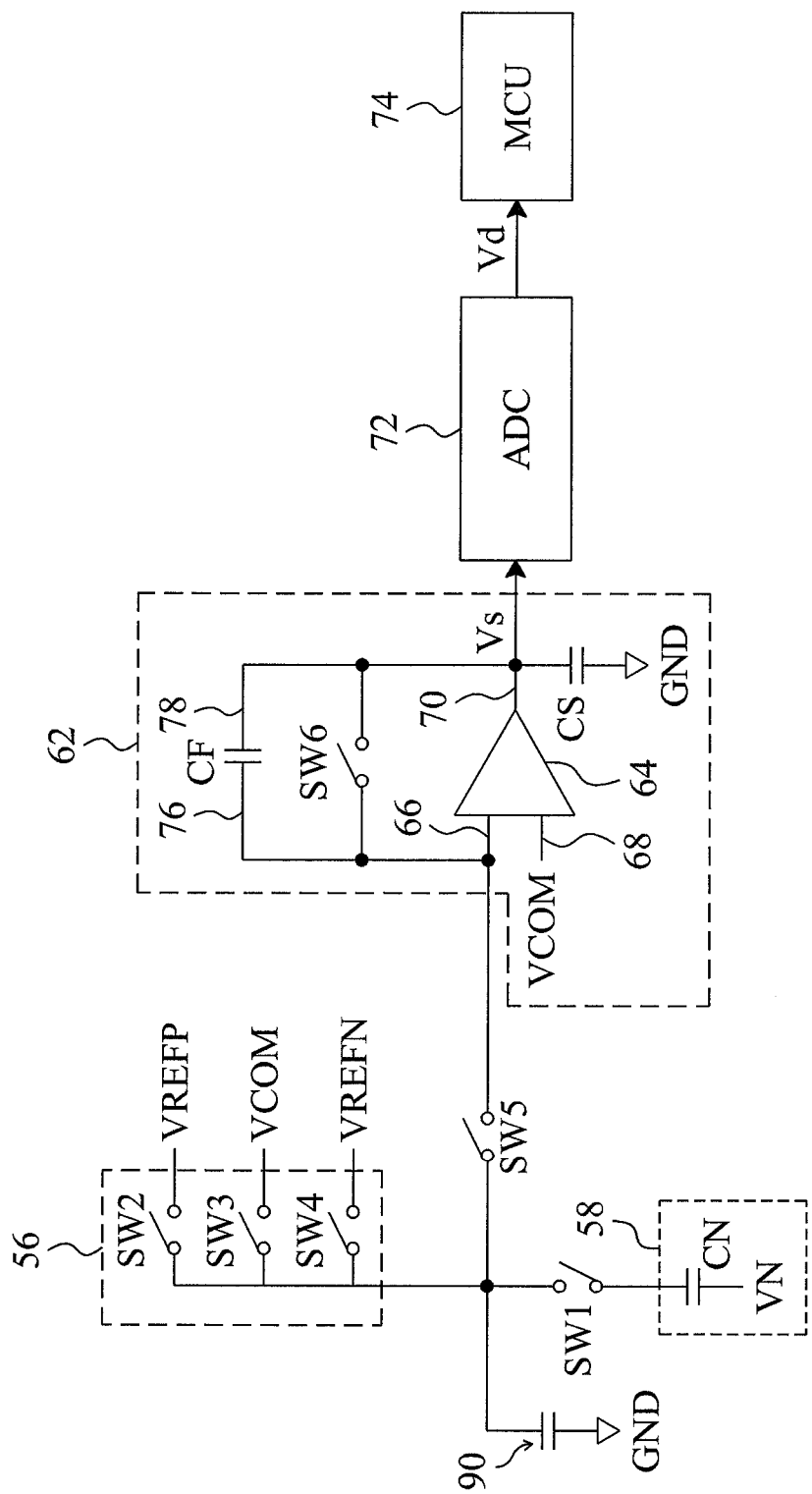
FIG. 6 is the equivalent circuit of the detector shown in FIG. 5 in a first mode.
Figure 7:
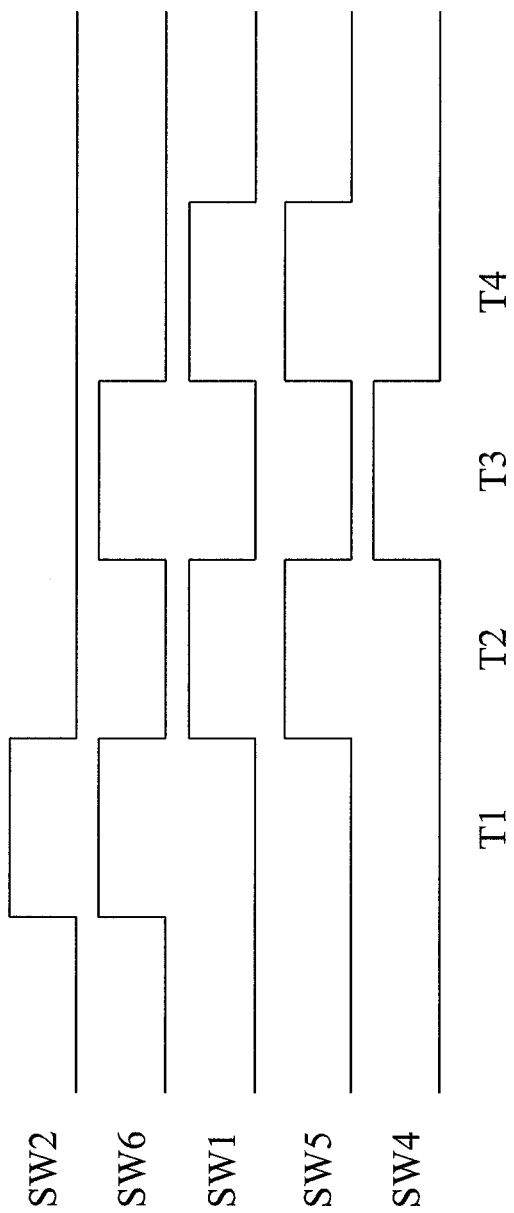
FIG. 7 is a timing diagram of the available switches shown in FIG. 6.
Figure 8:
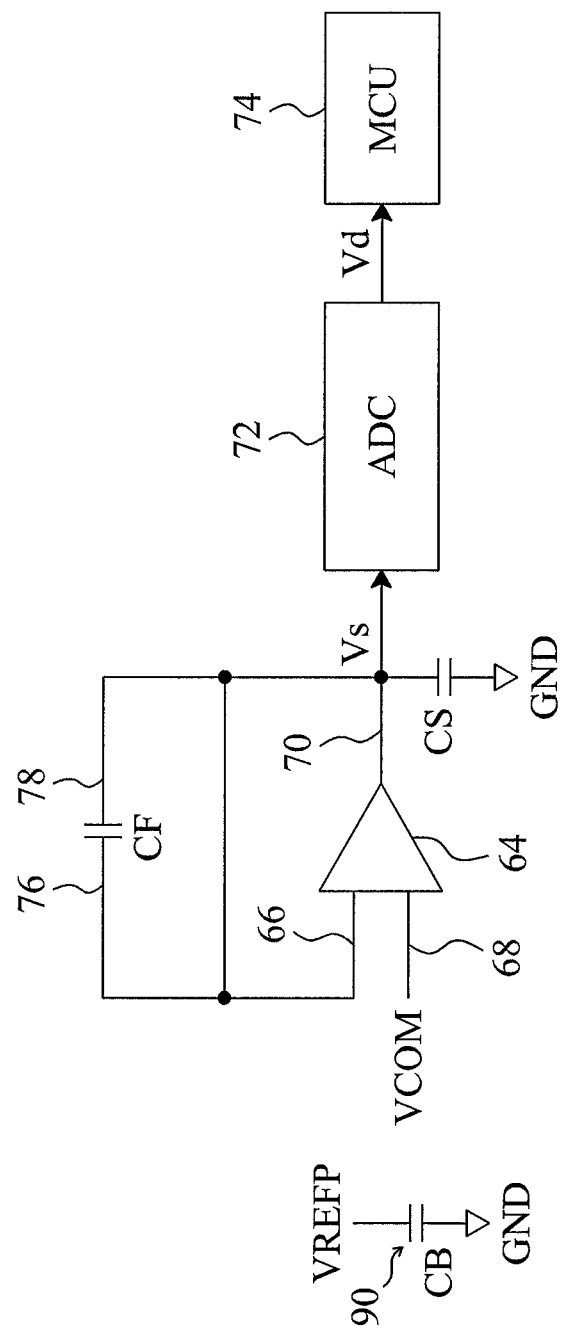
FIG. 8 is the equivalent circuit of the detector shown in FIG. 6 during the first time phase shown in FIG. 7 when no object touches a detected capacitance sensor trace.
Figure 9:
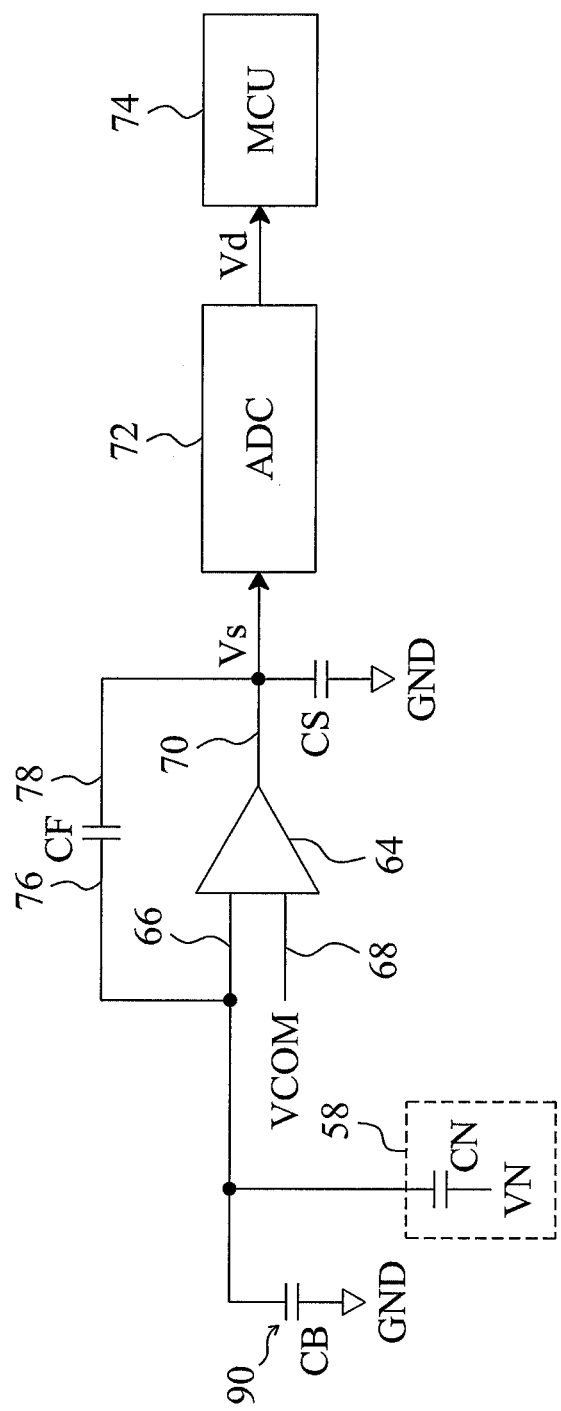
FIG. 9 is the equivalent circuit of the detector shown in FIG. 6 during the second and fourth time phases shown in FIG. 7 when no object touches a detected capacitance sensor trace.
Figure 10:
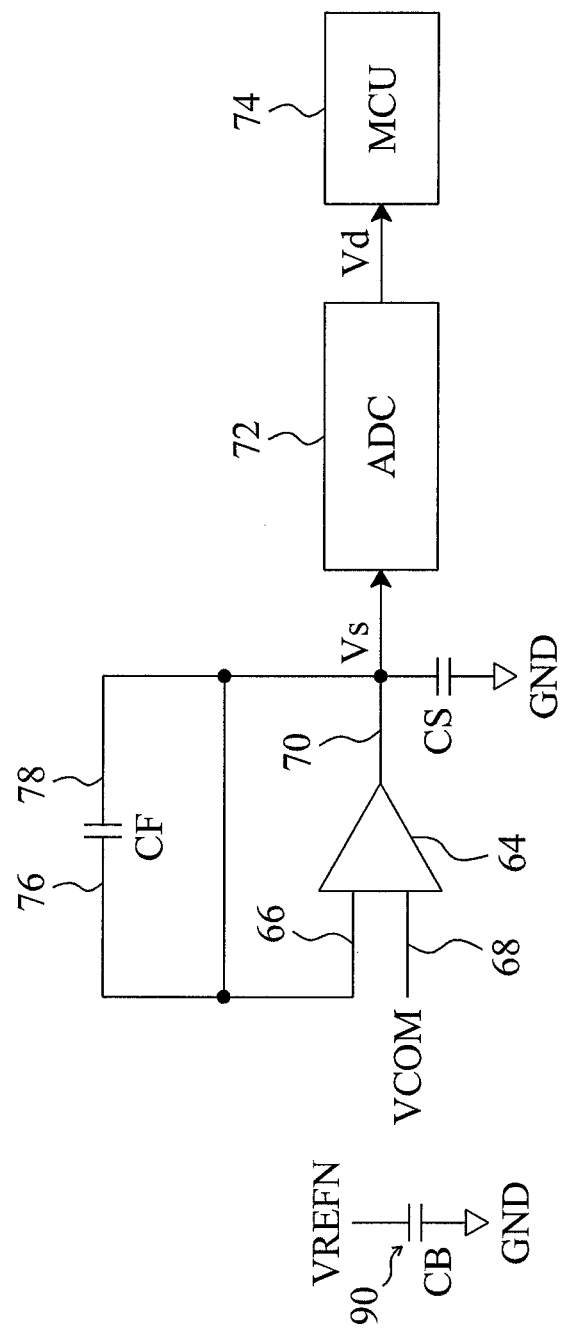
FIG. 10 is the equivalent circuit of the detector shown in FIG. 6 during the third time phase shown in FIG. 7 when no object touches a detected capacitance sensor trace.

In FIG. 5, when the input terminal 66 of the operational amplifier 64 is switched to the position a by the mode switching device 60, the detector 50 enters a first mode to detect the self capacitance from either of the capacitance sensor traces TX1-TXN and TY1-TYM. FIG. 6 is the equivalent circuit of the detector 50 in the first mode, and FIG. 7 is a timing diagram of the available switches SW1-SW2 and SW4-SW6 shown in FIG. 6. As shown in FIG. 7, the first mode includes four time phases T1-T4, and FIGS. 8-10 are the equivalent circuits of the detector 50 during the time phases T1-T4, when no object touches the detected capacitance sensor trace. Referring to FIGS. 7 and 8, during the time phase T1, the switches SW1, SW4 and SW5 are opened and the switches SW2 and SW6 are closed, so that the detected capacitance sensor trace is charged by the voltage source VREFP. Since no object touches the detected capacitance sensor trace, the self capacitor 90 of the detected capacitance sensor trace has the original capacitance CB and will store the charge $$Qcb = VREFP \times CB. \qquad \text{Eq-1}$$

For the operational amplifier 64 whose input terminal 66 is directly connected to its output terminal 70 now, due to the virtual short circuit between the input terminals 66 and 68 of the operational amplifier 64, the voltages on both the input terminal 66 and the output terminal 70 of the operational amplifier 64 are VCOM, and thus the terminals 76 and 78 of the gain control capacitor array CF are at an equal voltage VCOM and the charge stored in the gain control capacitor array CF is zero accordingly.

Referring to FIGS. 7 and 9, during the time phase T2, the switches SW1 and SW5 are closed and the switches SW2, SW4 and SW6 are opened, so that the self negative capacitance compensator 58 and the input terminal 66 of the operational amplifier 64 are connected to the detected capacitance sensor trace, and an amplifier configuration is established by the operational amplifier 64 and the gain control capacitor array CF. At this time, the voltage of the self negative capacitance compensator 58 is lower than the voltage VCOM. Due to the virtual short circuit between the input terminals 66 and 68 of the operational amplifier 64, the input terminal 66 is at a voltage equal to VCOM, and the self capacitor 90 will store the charge $$Qcb = VCOM \times CB. \qquad \text{Eq-2}$$

The capacitor CN stores the charge $$Qcn = (VCOM - VN) \times CN. \qquad \text{Eq-3}$$

The gain control capacitor array CF stores the charge $$Qcf = (Vs - VCOM) \times CF. \qquad \text{Eq-4}$$

According to the law of charge conservation, the net charge during the time phase T1 is equal to that of the time phase T2, i.e., $$VREFP \times CB = (VCOM \times CB) + (VCOM - VN) \times CN + (Vs - VCOM) \times CF, \qquad \text{Eq-5}$$

from which it is obtained $$(VREFP - VCOM) \times CB = (VCOM - VN) \times CN + (Vs - VCOM) \times CF. \qquad \text{Eq-6}$$

The MCU 74 may adjust the capacitance CN or the supply voltage VN in the self negative capacitance compensator 58 such that when no object touches the detected capacitance sensor trace, the charge stored in the self negative capacitance compensator 58 and that stored in the self capacitor 90 can cancel each other out, and thereby no remaining charge will be transferred to the gain control capacitor array CF. In other words, in case no object touches the detected capacitance sensor trace, the sense signal Vs outputted by the operational amplifier 64 is equal to VCOM, so that the equation Eq-6 may be modified into $$(VREFP - VCOM) \times CB = (VCOM - VN) \times CN. \qquad \text{Eq-7}$$

Referring to FIGS. 7 and 10, during the time phase T3, the switches SW1, SW2 and SW5 are opened and the switches SW4 and SW6 are closed, so that the detected capacitance sensor trace is charged by the voltage source VREFN and therefore the self capacitor 90 stores the charge $$Qcb = VREFN \times CB. \qquad \text{Eq-8}$$

The input terminal 66 of the operational amplifier 64 is directly connected to its output terminal 70 now, and due to the virtual short circuit between the input terminals 66 and 68 of the operational amplifier 64, the voltages on both the input terminal 66 and the output terminal 70 of the operational amplifier 64 are VCOM, and thus the terminals 76 and 78 of the gain control capacitor array CF are at an equal voltage VCOM and the charge stored in the gain control capacitor array CF is zero accordingly.

Referring to FIGS. 7 and 9, during the time phase T4, the switches SW1 and SW5 are closed and the switches SW2, SW4 and SW6 are opened, so that the self negative capacitance compensator 58 and the input terminal 66 of the operational amplifier 64 are connected to the detected capacitance sensor trace, and an amplifier configuration is established by the operational amplifier 64 and the gain control capacitor array CF. At this time, the voltage of the self negative capacitance compensator 58 is higher than the voltage VCOM. Due to the virtual short circuit between the input terminals 66 and 68 of the operational amplifier 64, the input terminal 66 of the operational amplifier 64 is at a voltage equal to VCOM, so that the charge Qcb stored in the self capacitor 90 is as shown in the equation Eq-2, the charge Qcn stored in the capacitor CN is as shown in the equation Eq-3, and the charge Qcf stored in the gain control capacitor array CF is as shown in the equation Eq-4. According to the law of charge conservation, the net charge during the time phase T3 is equal to that of the time phase T4, i.e., $$VREFN \times CB = (VCOM \times CB) + (VCOM - VN) \times CN + (Vs - VCOM) \times CF, \qquad \text{Eq-9}$$

from which it is obtained $$(VREFN - VCOM) \times CB = (VCOM - VN) \times CN + (Vs - VCOM) \times CF. \qquad \text{Eq-10}$$

In case no object touches the detected capacitance sensor trace, the MCU 74 may adjust the capacitance CN or the supply voltage VN in the self negative capacitance compensator 58 such that the charge stored in the self negative capacitance compensator 58 and that stored in the self capacitor 90 can cancel each other out and thereby, no remaining charge will be transferred to the gain control capacitor array CF and the sense signal Vs outputted by the operational amplifier 64 is equal to VCOM. Thus, the equation Eq-10 may be modified into $$(VREFN - VCOM) \times CB = (VCOM - VN) \times CN. \qquad \text{Eq-11}$$

Figure 11:
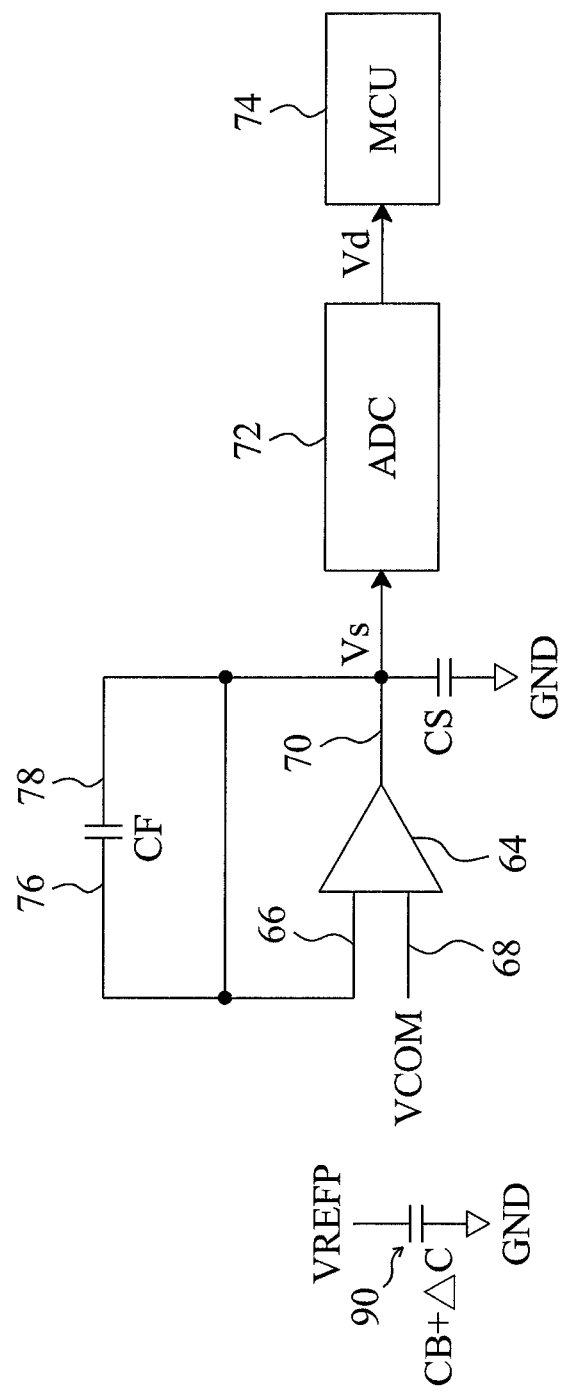
FIG. 11 is the equivalent circuit of the detector shown in FIG. 6 during the first time phase shown in FIG. 7 when a detected capacitance sensor trace is touched.
Figure 13:
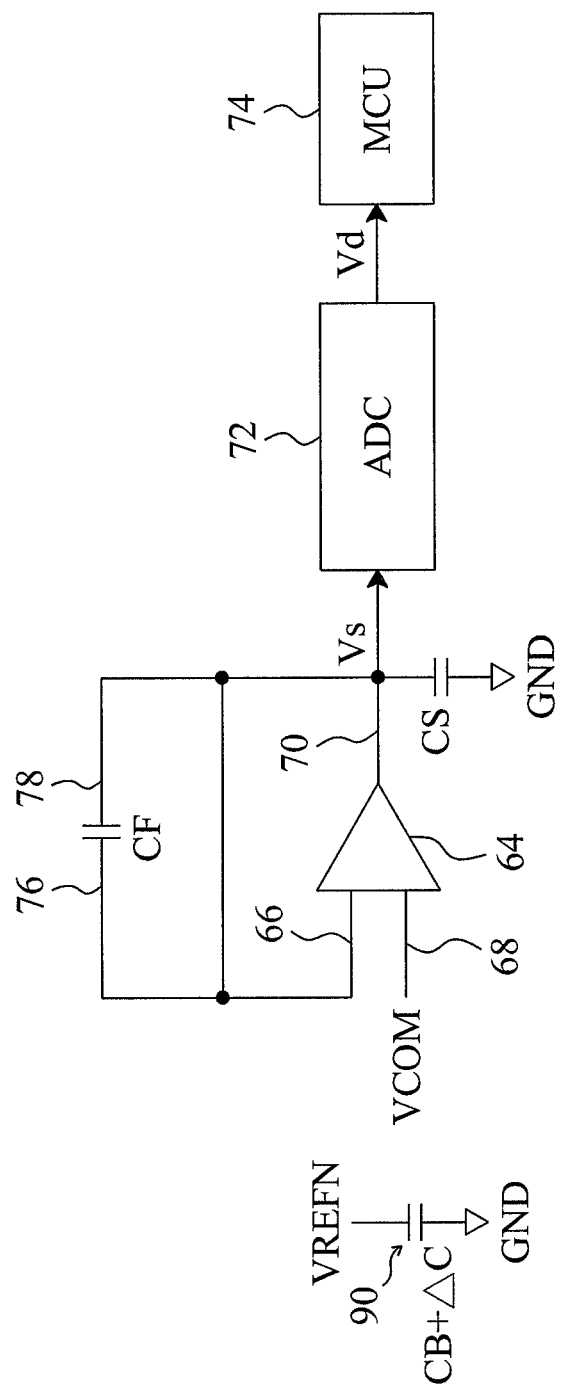
FIG. 13 is the equivalent circuit of the detector shown in FIG. 6 during the third time phase shown in FIG. 7 when a detected capacitance sensor trace is touched.

FIGS. 11 and 13 are the equivalent circuits of the detector 50 in the first mode during the time phases T1-T4 when the detected capacitance sensor trace is touched. Referring to FIGS. 7 and 11, during the time phase T1, the switches SW1, SW4 and SW5 are opened and the switches SW2 and SW6 are closed, so that the detected capacitance sensor trace is charged by the voltage source VREFP. Since the detected capacitance sensor trace is touched, the self capacitor 90 has a capacitance increment ΔC. As a result, the detected capacitance of the self capacitor 90 is changed into CB+ΔC, and the self capacitor 90 will store the charge $$Qcb = VREFP \times (CB + \Delta C). \qquad \text{Eq-12}$$

The input terminal 66 of the operational amplifier 64 is connected to the output terminal 70 now, and due to the virtual short circuit between the input terminals 66 and 68 of the operational amplifier 64, the voltages on both the input terminal 66 and the output terminal 70 of the operational amplifier 64 are VCOM and thus, the terminals 76 and 78 of the gain control capacitor array CF are at an equal voltage VCOM and the charge stored in the gain control capacitor array CF is zero accordingly.

Figure 12:
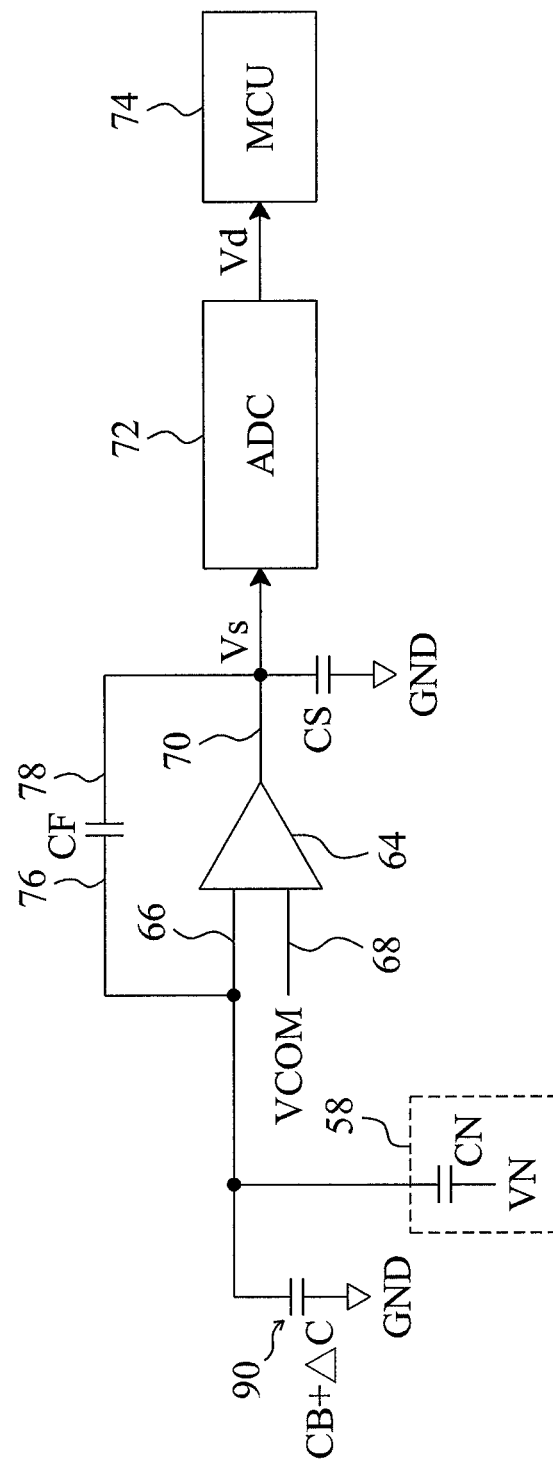
FIG. 12 is the equivalent circuit of the detector shown in FIG. 6 during the second and fourth time phases shown in FIG. 7 when a detected capacitance sensor trace is touched.

Referring to FIGS. 7 and 12, during the time phase T2, the switches SW1 and SW5 are closed and the switches SW2, SW4 and SW6 are opened, so that the self negative capacitance compensator 58 and the input terminal 66 of the operational amplifier 64 are connected to the detected capacitance sensor trace, and an amplifier configuration is established by the operational amplifier 64 and the gain control capacitor array CF. At this time, the voltage in the self negative capacitance compensator 58 is lower than the voltage VCOM. Due to the virtual short circuit between the input terminals 66 and 68 of the operational amplifier 64, the input terminal 66 of the operational amplifier 64 is at a voltage equal to VCOM, and the self capacitor 90 will store the charge $$Qcb = VCOM \times (CB + \Delta C).\qquad\text{Eq-13}$$

The charge stored in the capacitor CN is as shown in the equation Eq-3, and the charge stored in the gain control capacitor array CF is as shown in the equation Eq-4. According to the law of charge conservation, the net charge during the time phase T1 is equal to that of the time phase T2, i.e., $$VREFP \times (CB + \Delta C) = VCOM \times (CB + \Delta C) + (VCOM - VN) \times CN + (Vs - VCOM) \times CF,\qquad\text{Eq-14}$$

from which it is obtained $$(VREFP - VCOM) \times (CB + \Delta C) = (VCOM - VN) \times CN + (Vs - VCOM) \times CF.\qquad\text{Eq-15}$$

By substituting the equation Eq-7 into the equation Eq-15, it is obtained $$Vs = (\Delta C/CF)(VREFP - VCOM) + VCOM.\qquad\text{Eq-16}$$

Referring to FIGS. 7 and 13, during the time phase T3, the switches SW1, SW2 and SW5 are opened and the switches SW4 and SW6 are closed, so that the detected capacitance sensor trace is charged by the voltage source VREFN. Hence, the self capacitor 90 will store the charge $$Qcb = VREFN \times (CB + \Delta C).\qquad\text{Eq-17}$$

The input terminal 66 of the operational amplifier 64 is directly connected to the output terminal 70 now. Due to the virtual short circuit between the input terminals 66 and 68 of the operational amplifier 64, the voltages on both the input terminal 66 and the output terminal 70 of the operational amplifier 64 are VCOM and thus, the terminals 76 and 78 of the gain control capacitor array CF are at an equal voltage VCOM and the charge stored in the gain control capacitor array CF is zero accordingly.

Referring to FIGS. 7 and 12, during the time phase T4, the switches SW1 and SW5 are closed and the switches SW2, SW4 and SW6 are opened, so that the self negative capacitance compensator 58 and the input terminal 66 of the operational amplifier 64 are connected to the detected capacitance sensor trace, and an amplifier configuration is established by the operational amplifier 64 and the gain control capacitor array CF. At this time, the voltage in the self negative capacitance compensator 58 is higher than the voltage VCOM. Due to the virtual short circuit between the input terminals 66 and 68 of the operational amplifier 64, the input terminal 66 of the operational amplifier 64 is at a voltage equal to VCOM, so that the charge Qcb stored in the self capacitor 90 is as shown in the equation Eq-13, the charge Qcn stored in the capacitor CN is as shown in the equation Eq-3, and the charge Qcf stored in the gain control capacitor array CF is as shown in the equation Eq-4. According to the law of charge conservation, the net charge during the time phase T3 is equal to that of the time phase T4, i.e., $$VREFN \times (CB + \Delta C) = VCOM \times (CB + \Delta C) + (VCOM - VN) \times CN + (Vs - VCOM) \times CF,\qquad\text{Eq-18}$$

from which it is obtained $$(VREFN - VCOM) \times (CB + \Delta C) = (VCOM - VN) \times CN + (Vs - VCOM) \times CF.\qquad\text{Eq-19}$$

By substituting the equation Eq-11 into the equation Eq-19, it is obtained $$Vs = (\Delta C/CF)(VREFN - VCOM) + VCOM.\qquad\text{Eq-20}$$

The storage capacitor array CS stores the sense signals Vs generated during the time phases T2 and T4, and extracts the average therefrom to eliminate low-frequency noise. During the time phases T1 and T3, the detected capacitance sensor trace is charged by the voltage sources VREFP and VREFN, respectively, and therefore, the low-frequency noise of the sense signals Vs obtained from the time phases T2 and T4 will act as that a DC voltage is added to one of the sense signals Vs and the same DC voltage is subtracted from the other sense signal Vs. Hence, by averaging the two sense signals Vs, the magnitude of the noise is averaged into zero. The extracted average of the two sense signals Vs is converted into the digital signal Vd by the ADC 72. As described above, when no object touches the detected capacitance sensor trace, the sense signal Vs is equal to VCOM; on the other hand, when the detected capacitance sensor trace is touched, the sense signal Vs is as shown in the equation Eq-16 or Eq-20. Thereby, the MCU 74 can identify whether the detected capacitance sensor trace is touched according to the digital signal Vd. In the previously mentioned operation, actions corresponding to the time phases T3 and T4 may also be conducted before those corresponding to the time phases T1 and T2.

Figure 14:
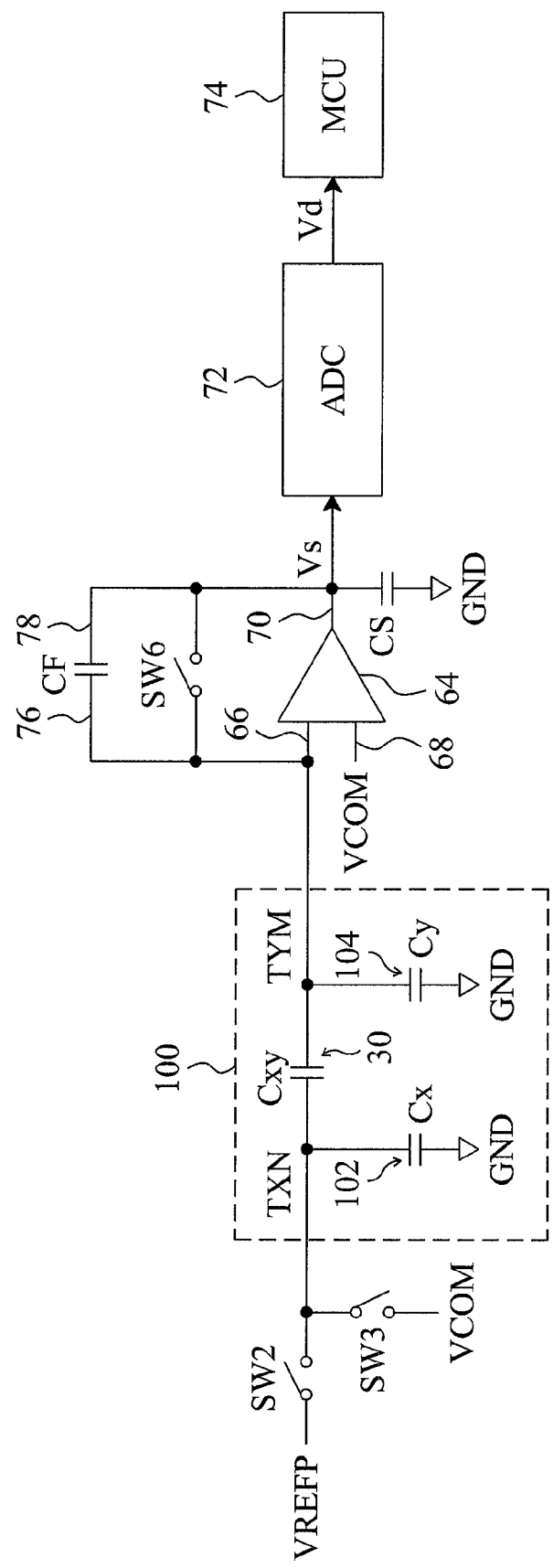
FIG. 14 is the equivalent circuit of the detector shown in FIG. 5 in a second mode.
Figure 15:
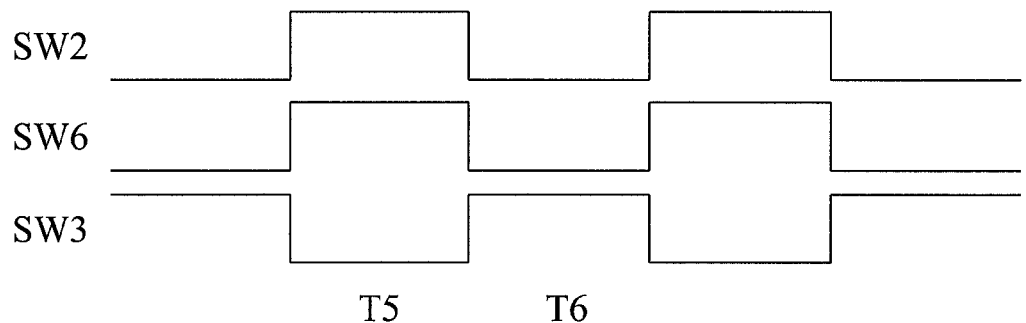
FIG. 15 is a timing diagram of the available switches shown in FIG. 14.
Figure 16:
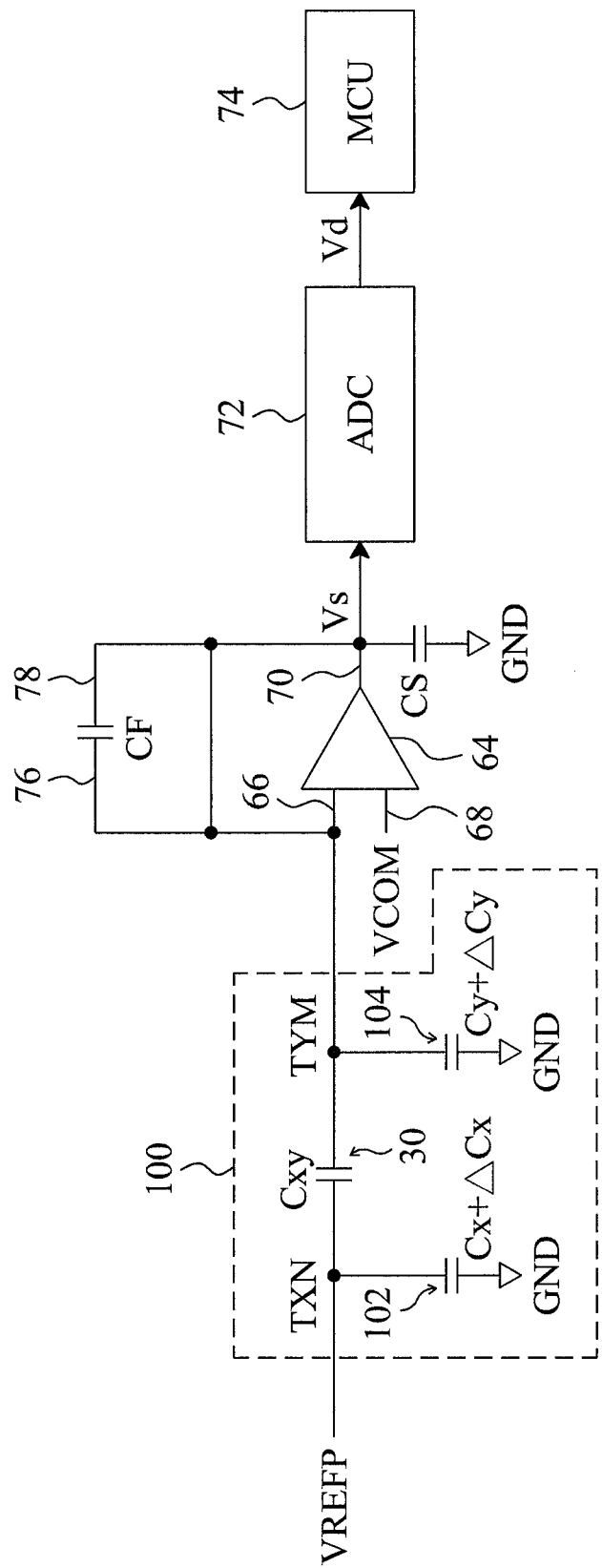
FIG. 16 is the equivalent circuit of the detector shown in FIG. 14 during the first time phase shown in FIG. 15 when no object touches a detected capacitance sensor trace.

Referring to FIG. 5, when the input terminal 66 of the operational amplifier 64 is switched to the position b by the mode switching device 60, the detector 50 enters a second mode to detect the mutual capacitor at an intersection of two capacitance sensor traces. FIG. 14 is the equivalent circuit of the detector 50 in the second mode, in which the multiplexers 52 and 54 select the capacitance sensor traces TXN and TYM, respectively. In the equivalent circuit 100 of the two capacitance sensor traces TXN and TYM, a self capacitor 102 of the capacitance sensor trace TXN has a capacitance Cx, a self capacitor 104 of the capacitance sensor trace TYM has a capacitance Cy, and the mutual capacitor 30 between the capacitance sensor traces TXN and TYM has a capacitance Cxy. FIG. 15 is a timing diagram of the available switches SW2, SW3 and SW6 shown in FIG. 14. As shown in FIG. 15, the second mode includes time phases T5 and T6, and FIGS. 16 and 17 are the equivalent circuits of the detector 50 in the second mode during the time phases T5 and T6, respectively.

When a detected touch point is a ghost point, although the self capacitors 102 and 104 of the capacitance sensor traces TXN and TYM have the capacitance increments $\Delta Cx$ and $\Delta Cy$, respectively, the mutual capacitor 30 has no capacitance increment because the intersection of the capacitance sensor traces TXN and TYM is not actually touched. Referring to FIGS. 15 and 16, during the time phase T5, the switches SW2 and SW6 are closed and the switch SW3 is opened, so that the voltage source VREFP is connected to the capacitance sensor trace TXN and the input terminal 66 of the operational amplifier 64 is connected to the output terminal 70. Due to the virtual short circuit between the input terminals 66 and 68 of the operational amplifier 64, the voltages on both the input terminal 66 and the output terminal 70 of the operational amplifier 64 are VCOM and thus, the terminals 76 and 78 of the gain control capacitor array CF are at an equal voltage VCOM and the charge stored in the gain control capacitor array CF is zero accordingly. At this time, the charge stored in the mutual capacitor 30 is $$Qcxy=(VREFP-VCOM)\times Cxy. \quad \text{Eq-21}$$

Figure 17:
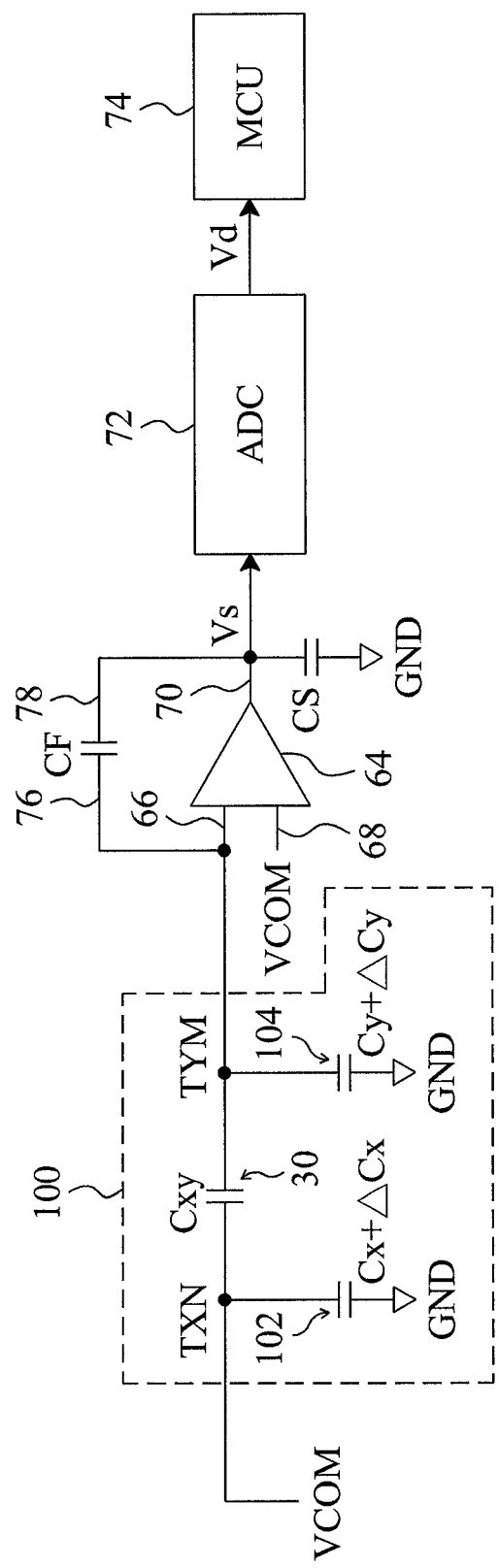
FIG. 17 is the equivalent circuit of the detector shown in FIG. 14 during the second time phase shown in FIG. 15 when no object touches a detected capacitance sensor trace.

Referring to FIGS. 15 and 17, during the time phase T6, the switches SW2 and SW6 are opened and the switch SW3 is closed. At this time, the capacitance sensor traces TXN and TYM are at a same potential, so that the charge stored in the mutual capacitor 30 is transferred to the gain control capacitor array CF and thereby, the charge stored in the gain control capacitor array CF is $$Qcf=(Vs-VCOM)\times CF=(VREFP-VCOM)\times Cxy, \quad \text{Eq-22}$$

from which it is derived the sense signal $$Vs=(Cxy/CF)\times(VREFP-VCOM)+VCOM. \quad \text{Eq-23}$$

As shown by the equation Eq-23, the variations of the capacitances of the self capacitors 102 and 104 of the capacitance sensor traces TXN and TYM have no effect on the sense signal Vs.

Figure 18:
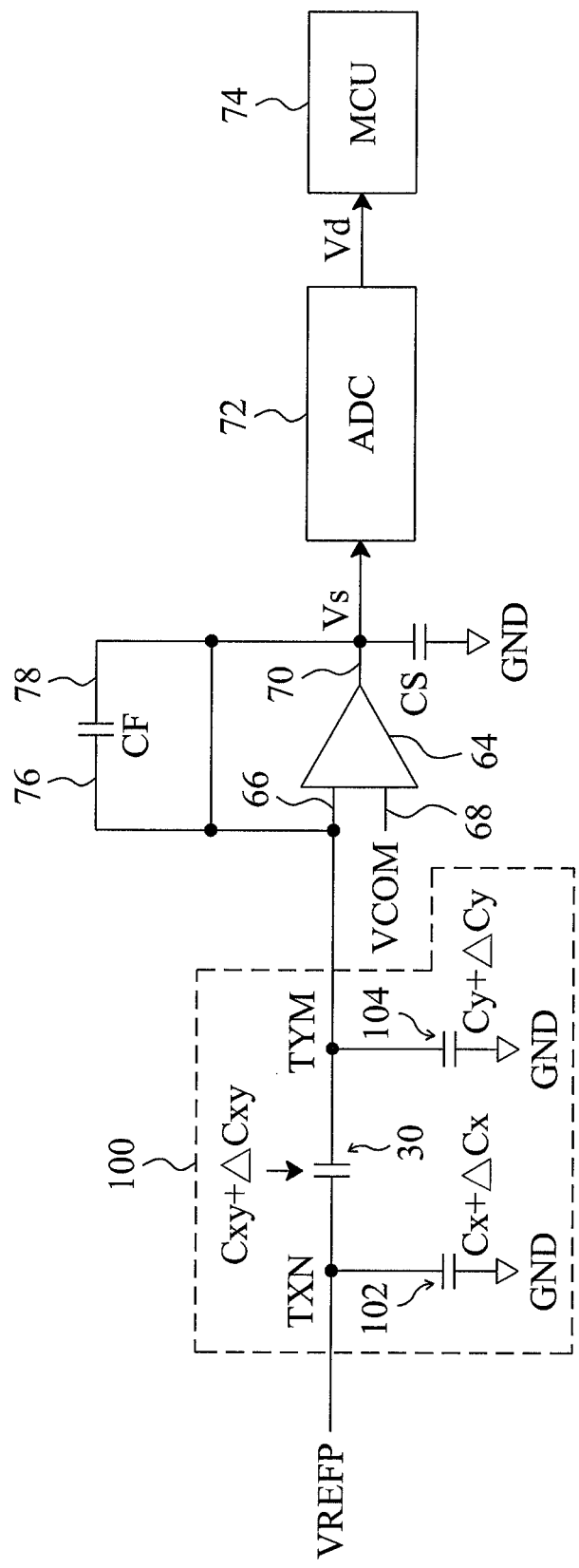
FIG. 18 is the equivalent circuit of the detector shown in FIG. 14 during the first time phase shown in FIG. 15 when a detected capacitance sensor trace is touched.
Figure 19:
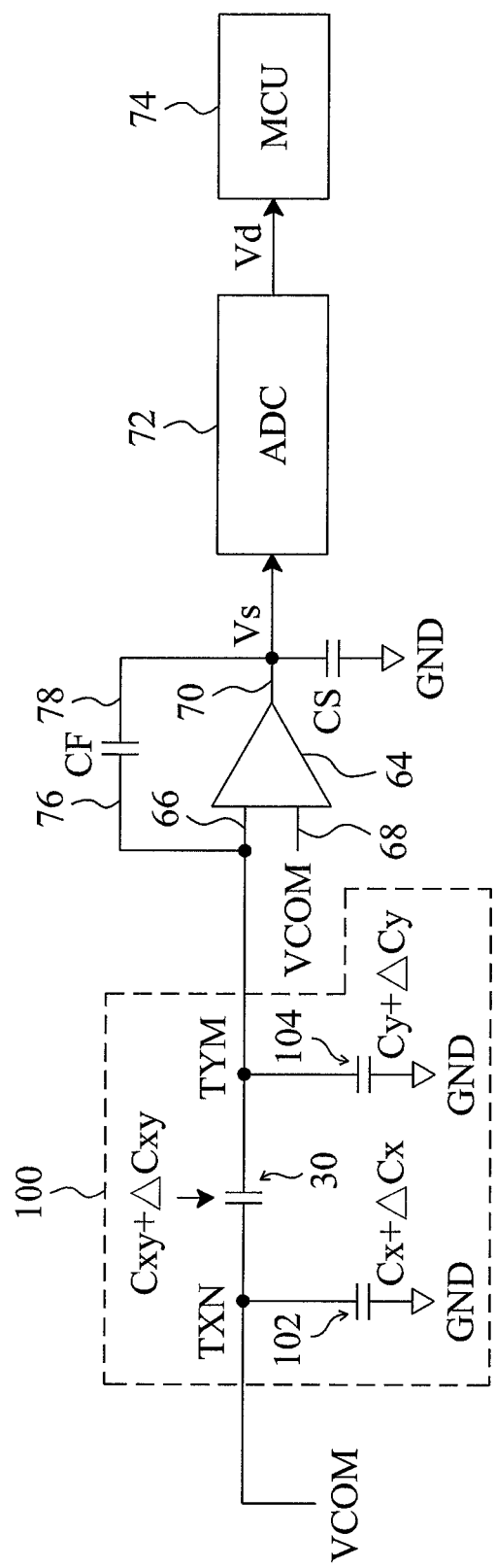
FIG. 19 is the equivalent circuit of the detector shown in FIG. 14 during the second time phase shown in FIG. 15 when a detected capacitance sensor trace is touched.

When the detected touch point is a real touch point, the self capacitors 102 and 104 of the capacitance sensor traces TXN and TYM have the capacitance increments ΔCx and ΔCy, respectively, and because the intersection of the capacitance sensor traces TXN and TYM is touched, the mutual capacitor 30 also has a capacitance increment ΔCxy. FIGS. 18 and 19 are the equivalent circuits of the detector 50 in the second mode during the time phases T5 and T6, respectively. Referring to FIGS. 15 and 18, during the time phase T5, the switches SW2 and SW6 are closed and the switch SW3 is opened, so that the voltage source VREFP is connected to the capacitance sensor trace TXN, and the input terminal 66 of the operational amplifier 64 is connected to the output terminal 70. Due to the virtual short circuit between the input terminals 66 and 68 of the operational amplifier 64, the voltages on both the input terminal 66 and the output terminal 70 of the operational amplifier 64 are VCOM and thus, the terminals 76 and 78 of the gain control capacitor array CF are at an equal voltage VCOM and the charge stored in the gain control capacitor array CF is zero accordingly. On the other hand, the charge stored in the mutual capacitor 30 is $$Qcxy=(VREFP-VCOM)\times(Cxy+\Delta Cxy). \quad \text{Eq-24}$$

Referring to FIGS. 15 and 19, during the time phase T6, the switches SW2 and SW6 are opened and the switch SW3 is closed. At this time, the capacitance sensor traces TXN and TYM are at a same potential, so that the charge stored in the mutual capacitor 30 is transferred to the gain control capacitor array CF and thereby, the charge stored in the gain control capacitor array CF is $$Qcf=(Vs-VCOM)\times CF=(VREFP-VCOM)\times(Cxy+\Delta Cxy), \quad \text{Eq-25}$$

from which it is derived the sense signal $$Vs=[(Cxy+\Delta Cxy)/CF]\times(VREFP-VCOM)+VCOM. \quad \text{Eq-26}$$

As shown by the equation Eq-26, the variations of the capacitances of the self capacitors 102 and 104 of the capacitance sensor traces TXN and TYM have no effect on the sense signal Vs.

Figure 1:
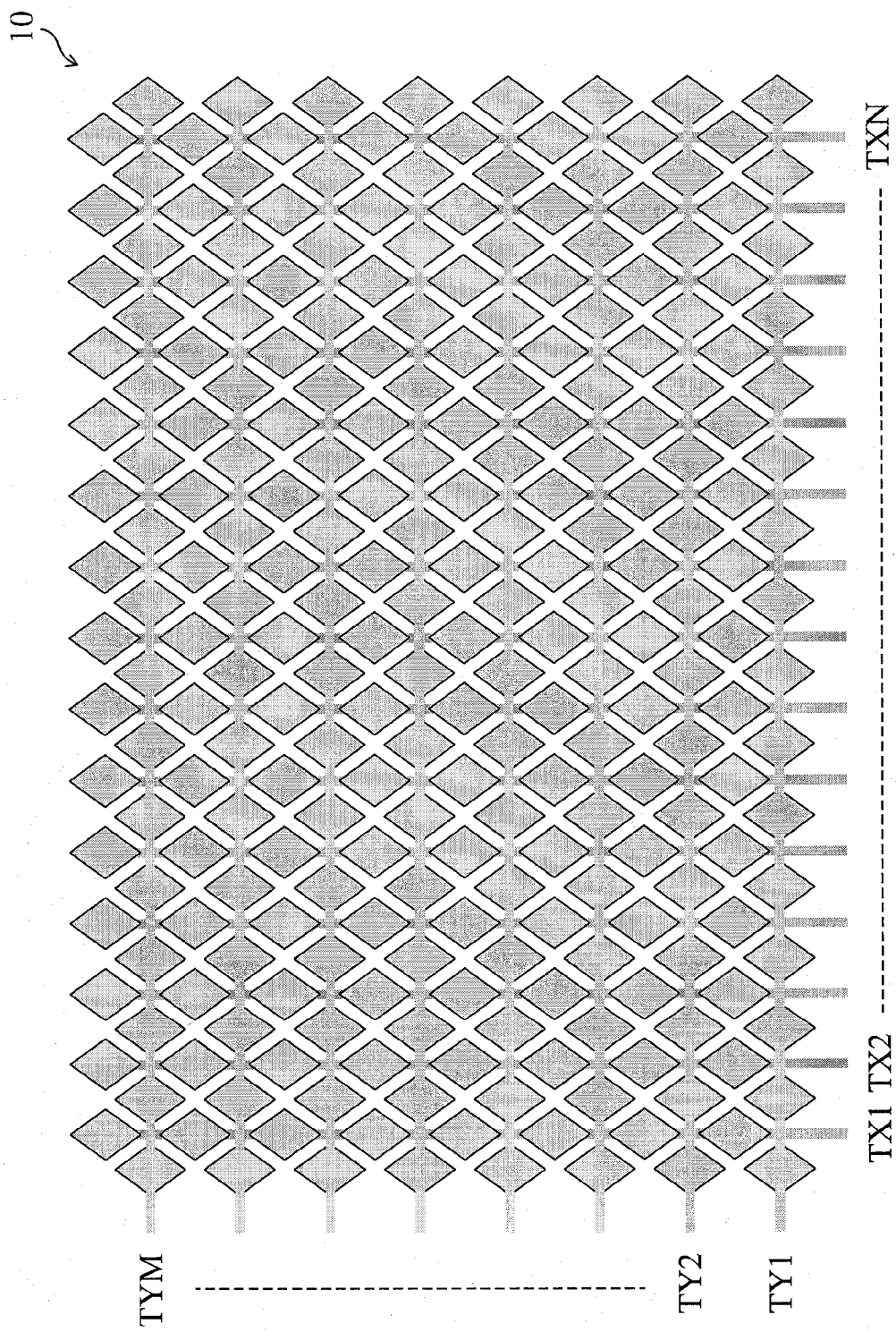
FIG. 1 is a simplified diagram showing the layout of a conventional two-dimensional capacitive touchpad.
Figure 2:
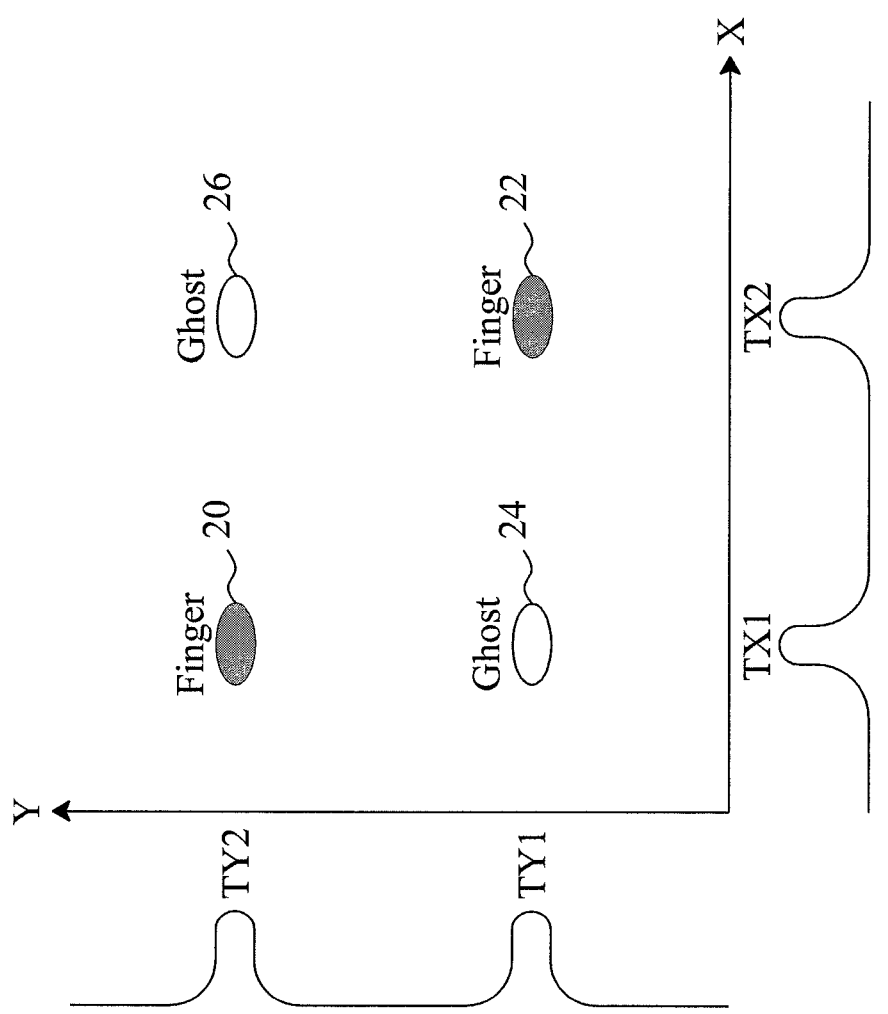
FIG. 2 is a schematic view showing a ghost phenomenon caused by two fingers simultaneously touching a capacitive touchpad.

Comparing the equation Eq-23 with the equation Eq-26, the mutual capacitances of a real touch point and a ghost point are different, so that the induced sense signals Vs are different. After a sense signal Vs is converted into a digital signal Vd by the ADC 72, the MCU 74 can easily identify whether the intersection of the detected capacitance sensor traces TXN and TYM is touched according to the magnitude of the digital signal Vd. For example, as long as the digital signal Vd is detected to be greater than a threshold, it can be determined that the detected point is a real touch point. Referring to FIG. 2, when the positions 20 and 22 of a capacitive touchpad are touched simultaneously, although the self capacitances of the capacitance sensor traces TX1, TX2, TY1 and TY2 all have variations, both the mutual capacitance at the intersection of the capacitance sensor traces TX1 and TY1 and the mutual capacitance at the intersection of the capacitance sensor traces TX2 and TY2 have no variations because the positions 24 and 26 are not touched. Thereby, the possibility that objects touch at the positions 24 and 26 can be excluded and the possibility of false determination caused by the ghost points can be eliminated. Furthermore, it is unnecessary for the detector 50 to detect the mutual capacitances of all the touch points 20, 22, 24 and 26, and the touch points can be identified properly by detecting only any two of the touch points 20, 22, 24 and 26.

Figure 20:
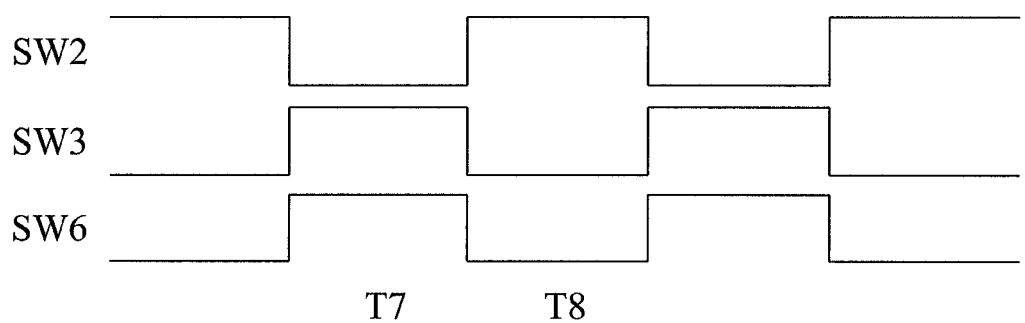
FIG. 20 is another timing diagram of the available switches shown in FIG. 14.
Figure 21:
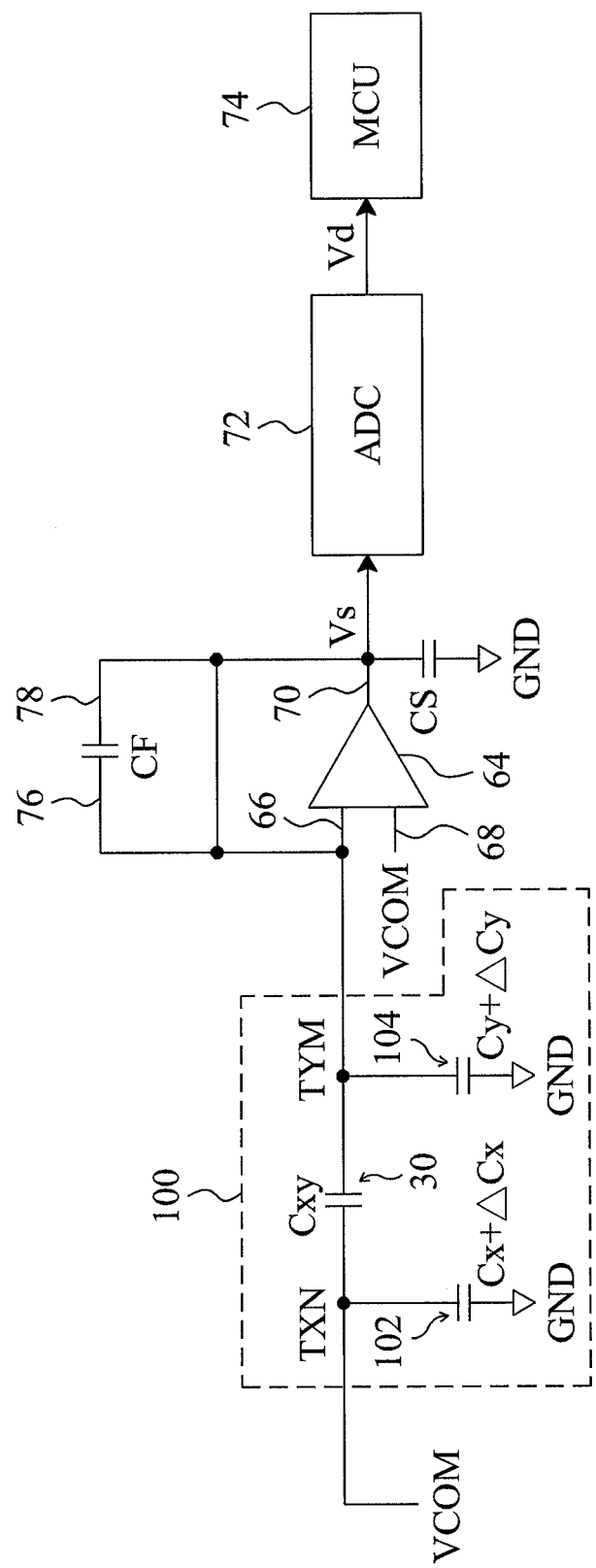
FIG. 21 is the equivalent circuit of the detector shown in FIG. 14 during the first time phase shown in FIG. 20 when no object touches a detected capacitance sensor trace.
Figure 22:
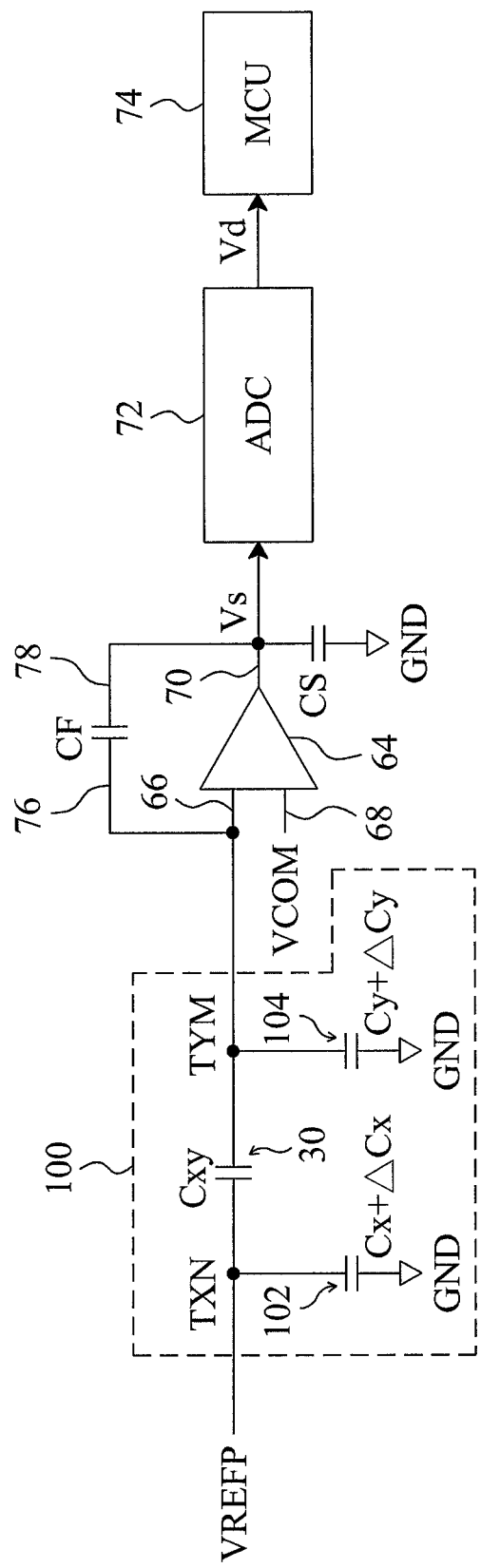
FIG. 22 is the equivalent circuit of the detector shown in FIG. 14 during the second time phase shown in FIG. 20 when no object touches a detected capacitance sensor trace.

FIG. 20 is another timing diagram of the available switches SW2, SW3 and SW6 shown in FIG. 14, and FIGS. 21 and 22 are the equivalent circuits of the detector 50 in the second mode during time phases T7 and T8. When the detected touch point is a ghost point, the self capacitors 102 and 104 of the capacitance sensor traces TXN and TYM have the capacitance increments ΔCx and ΔCy, respectively, while the mutual capacitor 30 has no capacitance increment. Referring to FIGS. 20 and 21, during the time phase T7, the switch SW2 is opened and the switches SW3 and SW6 are closed, so that the voltage source VCOM is connected to the capacitance sensor trace TXN and the input terminal 66 of the operational amplifier 64 is connected to the output terminal 70. Due to the virtual short circuit between the input terminals 66 and 68 of the operational amplifier 64, the voltages on both the input terminal 66 and the output terminal 70 of the operational amplifier 64 are VCOM and thus, the terminals 76 and 78 of the gain control capacitor array CF are at an equal voltage VCOM and the charge stored in the gain control capacitor array CF is zero accordingly. Also, the terminals TXN and TYM of the mutual capacitor 30 are at an equal voltage VCOM, so that the charge stored in the mutual capacitor 30 is zero accordingly. Referring to FIGS. 20 and 22, during the time phase T8, the switch SW2 is closed and the switches SW3 and SW6 are opened. At this time, the capacitance sensor trace TXN is connected to the voltage source VREFP, so that the charge stored in the mutual capacitor 30 is $$Qcxy=(VREFP-VCOM)\times Cxy. \quad \text{Eq-27}$$

According to the law of charge conservation, the voltage on the second terminal 78 of the gain control capacitor array CF occurs a variation, i.e., the sense signal Vs occurs a variation. It can be known from the equation Eq-27 that the charge stored in the gain control capacitor array CF is $$Qcf=(Vs-VCOM)\times CF=-(VREFP-VCOM)\times Cxy, \quad \text{Eq-28}$$

from which it is derived the sense signal $$Vs=(-Cxy/CF)\times(VREFP-VCOM)+VCOM. \quad \text{Eq-29}$$

When the detected touch point is a real touch point, the self capacitors 102 and 104 of the capacitance sensor traces TXN and TYM have the capacitance increments ΔCx and ΔCy, respectively, and the mutual capacitor 30 also has the capacitance increment ΔCxy, so that the equation Eq-29 may be rewritten into $$Vs=[(-Cxy+\Delta Cxy)/CF]\times(VREFP-VCOM)+VCOM. \quad \text{Eq-30}$$

As shown by the equations Eq-29 and Eq-30, the variations of the capacitances of the self capacitors 102 and 104 of the capacitance sensor traces TXN and TYM have no effect on the sense signal Vs. Comparing the equation Eq-29 with the equation Eq-30, the mutual capacitances of a real touch point and a ghost point are different, so that the induced sense signals Vs are different. After a sense signal Vs is converted into a digital signal Vd by the ADC 72, the MCU 74 can easily identify whether the intersection of the capacitance sensor traces TXN and TYM is touched according to the magnitude of the digital signal Vd.

Figure 23:
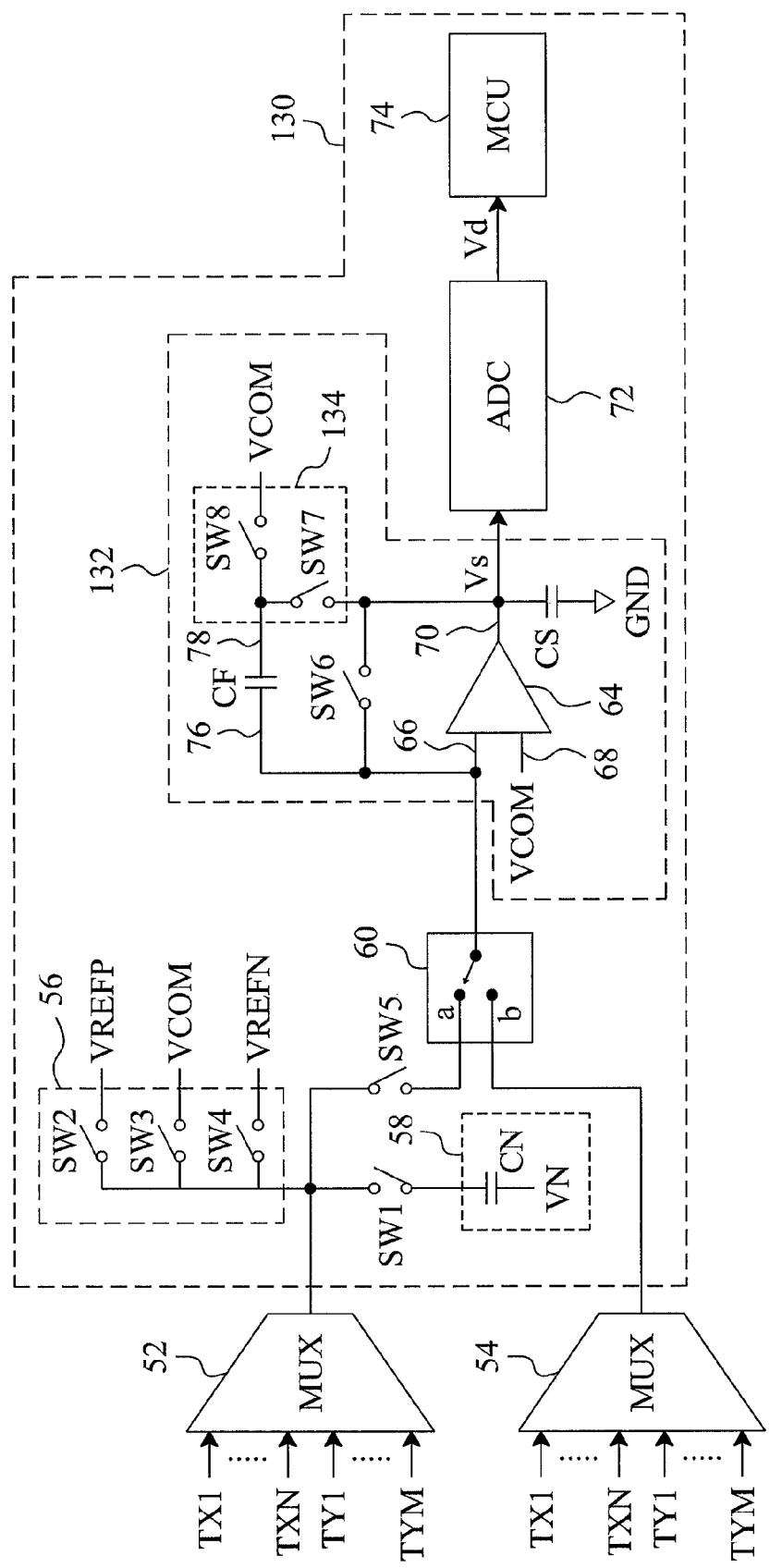
FIG. 23 is the circuit diagram of a second embodiment according to the present invention to carry out the process of FIG. 4.

FIG. 23 is the circuit diagram of a second embodiment according to the present invention. Similar to that shown in FIG. 5, the detector 130 in this embodiment includes the nodes having the supply voltages VREFP, VCOM and VREFN, the switching circuit 56, the self negative capacitance compensator 58, the mode switching device 60, the ADC 72, and the MCU 74. In addition to the operational amplifier 64, the gain control capacitor array CF, the storage capacitor array CS and the switch SW6, the sensing circuit 132 of the detector 130 further includes a switching circuit 134. The terminal 78 of the gain control capacitor array CF is connected to the voltage source VCOM or the output terminal 70 of the operational amplifier 64 depending on the switching circuit 134 which has a switch SW7 connected between the terminal 78 of the gain control capacitor array CF and the output terminal 70 of the operational amplifier 64, and a switch SW8 connected between the terminal 78 of the gain control capacitor array CF and the voltage source VCOM.

Figure 24:
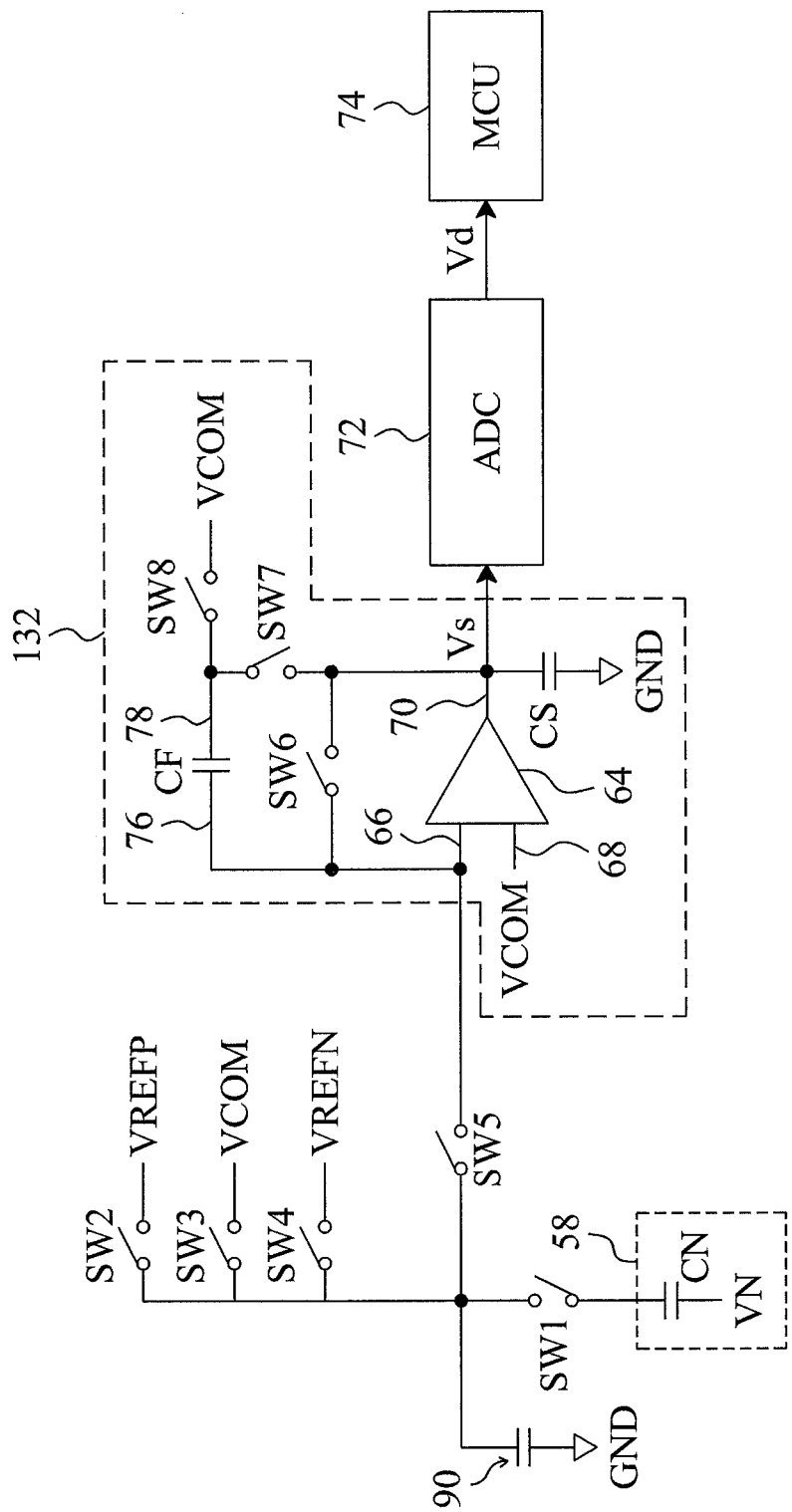
FIG. 24 is the equivalent circuit of the detector shown in FIG. 23 in a first mode.
Figure 25:
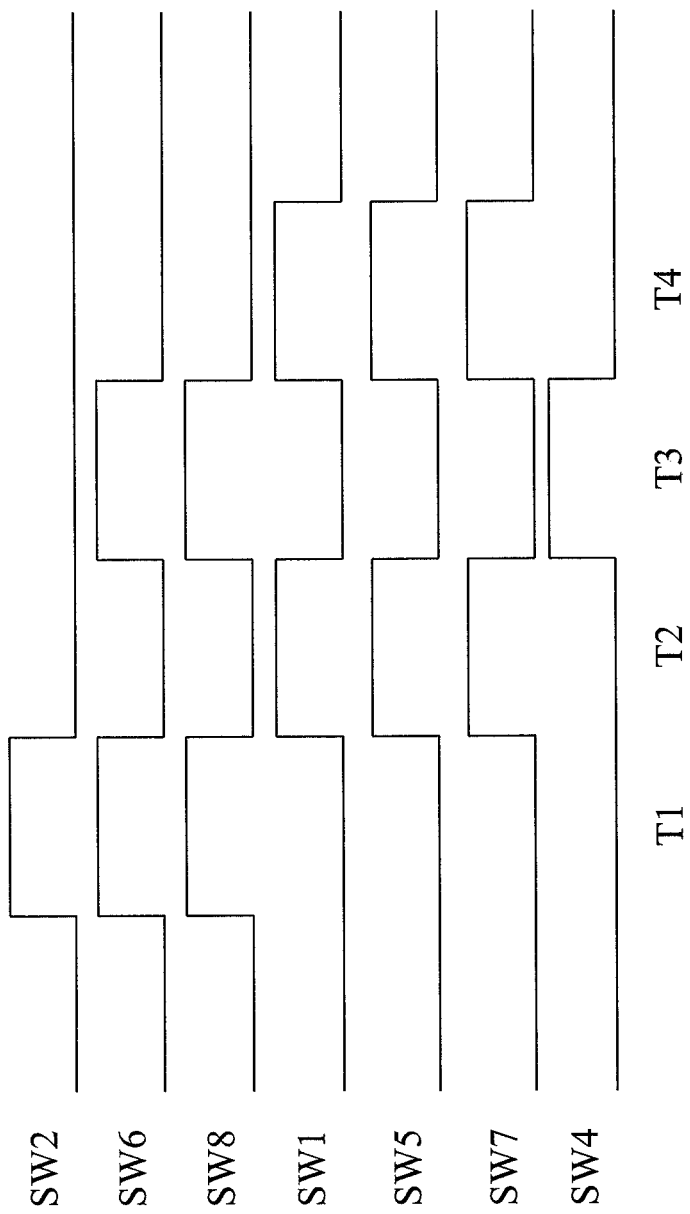
FIG. 25 is a timing diagram of the available switches shown in FIG. 24.
Figure 26:
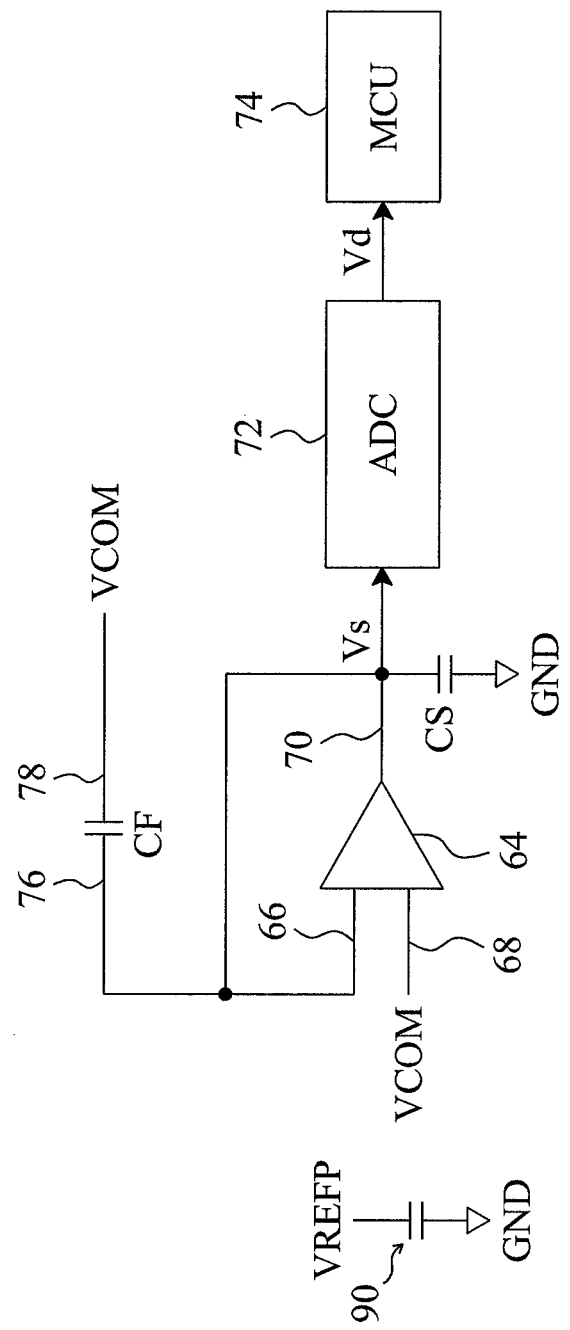
FIG. 26 is the equivalent circuit of the detector shown in FIG. 24 during the first time phase shown in FIG. 25.
Figure 27:
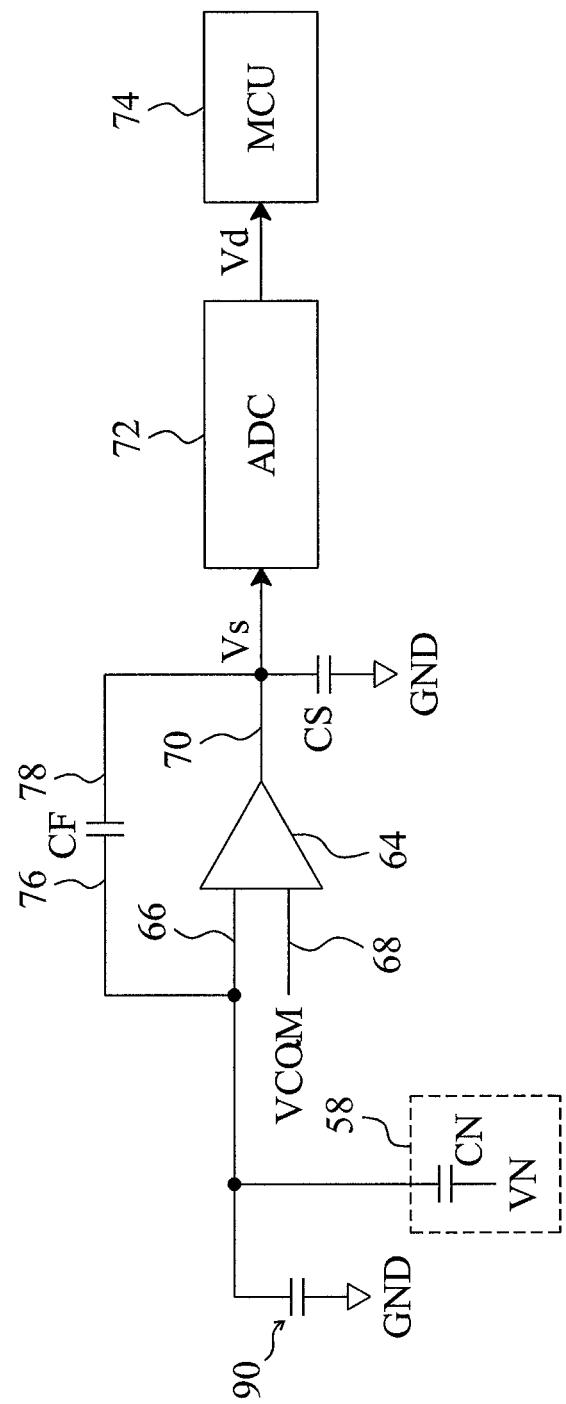
FIG. 27 is the equivalent circuit of the detector shown in FIG. 24 during the second and fourth time phases shown in FIG. 25.
Figure 28:
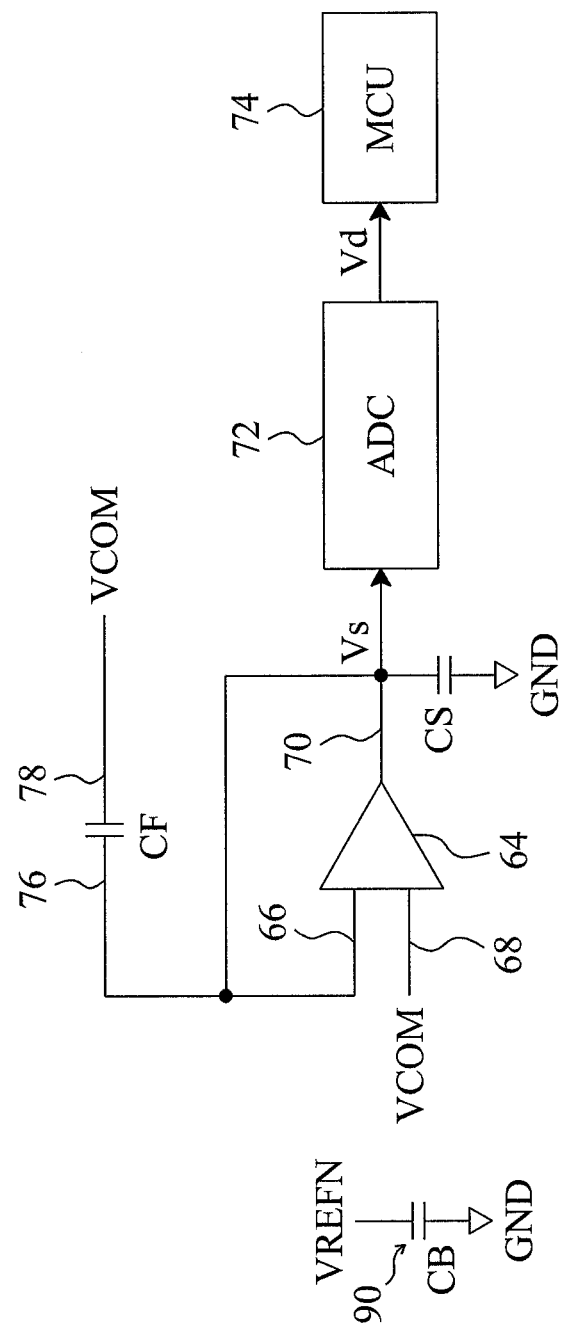
FIG. 28 is the equivalent circuit of the detector shown in FIG. 24 during the third time phase shown in FIG. 25.

When the mode switching device 60 switches to the position a, the detector 130 enters a first mode to detect the self capacitance of either of the capacitance sensor traces TX1-TXN and TY1-TYM. FIG. 24 is the equivalent circuit of the detector 130 in the first mode, and FIG. 25 is a timing diagram of the available switches SW1-SW2 and SW4-SW8 shown in FIG. 24. As shown in FIG. 25, the first mode includes time phases T1, T2, T3 and T4, and FIGS. 26-28 are the equivalent circuits of the detector 130 in the first mode during the time phases T1-T4. Referring to FIGS. 25 and 26, during the time phase T1, the switches SW2, SW6 and SW8 are closed and the switches SW1, SW4, SW5 and SW7 are opened, so that the self capacitor 90 of the detected capacitance sensor trace is charged by the voltage source VREFP, the operational amplifier 64 is configured to have unit gain, and the terminal 78 of the gain control capacitor array CF is connected to the voltage source VCOM. Due to the virtual short circuit between the input terminals 66 and 68 of the operational amplifier 64, the voltages on both the input terminal 66 and the output terminal 70 of the operational amplifier 64 are equal to VCOM and thus, the terminals 76 and 78 of the gain control capacitor array CF are both at the voltage VCOM and the charge stored in the gain control capacitor array CF is zero accordingly.

Referring to FIGS. 25 and 27, during the time phase T2, the switches SW1, SW5 and SW7 are closed and the switches SW2, SW4, SW6 and SW8 are opened, so that the self negative capacitance compensator 58 is connected to the detected capacitance sensor trace to compensate the self capacitor 90 of the capacitance sensor trace, the terminal 78 of the gain control capacitor array CF is connected to the output terminal 70 of the operational amplifier 64, and the operational amplifier 64 and the gain control capacitor array CF establish an amplifier configuration in generation of a sense signal Vs according to the detected capacitance of the self capacitor 90. The sense signal Vs will be stored in the storage capacitor array CS. As described above, if the detected capacitance sensor trace is not touched, the charge stored in the self capacitor 90 will not be transferred to the gain control capacitor array CF due to the presence of the self negative capacitance compensator 58, so at this time, and the sense signal Vs on the output terminal 70 of the operational amplifier 64 will be equal to VCOM accordingly. On the other hand, if the detected capacitance sensor trace is touched, the self capacitor 90 will have a capacitance increment and therefore, the sense signal Vs will be as shown in the equation Eq-16.

Referring to FIGS. 25 and 28, during the time phase T3, the switches SW4, SW6 and SW8 are closed and the switches SW1, SW2, SW5 and SW7 are opened, so that the self capacitor 90 of the detected capacitance sensor trace is charged by the voltage source VREFN, the terminal 78 of the gain control capacitor array CF is connected to the voltage source VCOM, and the operational amplifier 64 is thus configured to have unit gain. Due to the virtual short circuit between the input terminals 66 and 68 of the operational amplifier 64, the voltages on both the input terminal 66 and the output terminal 70 of the operational amplifier 64 are equal to VCOM and thus the terminals 76 and 78 of the gain control capacitor array CF are both at the voltage VCOM and thereby, the charge stored in the gain control capacitor array CF is zero accordingly.

Referring to FIGS. 25 and 27, during the time phase T4, the switches SW1, SW5 and SW7 are closed and the switches SW2, SW4, SW6 and SW8 are opened, so that the self negative capacitance compensator 58 is connected to the detected capacitance sensor trace to compensate the self capacitor 90 of the capacitance sensor trace, and the terminal 78 of the gain control capacitor array CF is connected to the output terminal 70 of the operational amplifier 64, and the operational amplifier 64 and the gain control capacitor array CF establish an amplifier configuration in generation of a sense signal Vs according to the capacitance of the self capacitor 90. The sense signal Vs will be stored in the storage capacitor array CS, and the storage capacitor array CS will extract the average from the sense signals Vs obtained during the time phases T2 and T4 to eliminate low-frequency noise. As described above, if the detected capacitance sensor trace is not touched, the charge stored in the self capacitor 90 will not be transferred to the gain control capacitor array CF due to the presence of the self negative capacitance compensator 58, and the sense signal Vs on the output terminal 70 of the operational amplifier 64 is equal to VCOM accordingly. On the other hand, if the detected capacitance sensor trace is touched, the self capacitor 90 will have a capacitance increment and therefore, the sense signal Vs will be as shown in the equation Eq-20.

Figure 29:
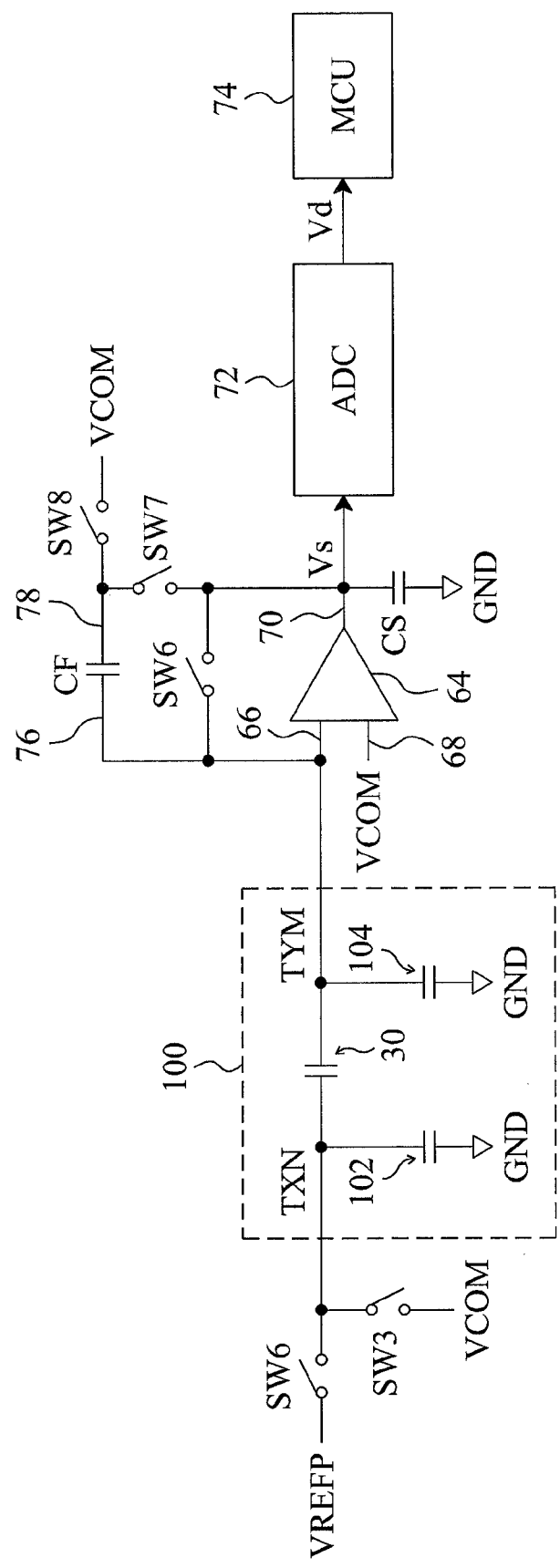
FIG. 29 is the equivalent circuit of the detector shown in FIG. 23 in a second mode.
Figure 30:
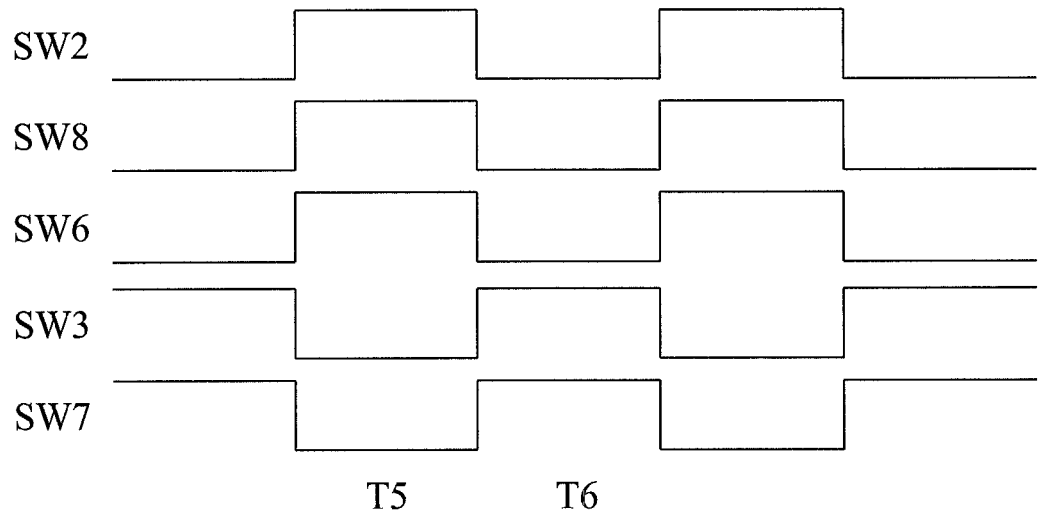
FIG. 30 is a timing diagram of the available switches shown in FIG. 29.

Referring to FIG. 23, when the input terminal 66 of the operational amplifier 64 is switched to the position b by the mode switching device 60, the detector 130 enters a second mode to detect the mutual capacitance at an intersection of two capacitance sensor traces. FIG. 29 is the equivalent circuit of the detector 130 in the second mode, in which the multiplexers 52 and 54 select the capacitance sensor traces TXN and TYM, respectively. In the equivalent circuit 100 of the capacitance sensor traces TXN and TYM, the capacitance sensor trace TXN has a self capacitor 102, the capacitance sensor trace TYM has a self capacitor 104, and between the capacitance sensor traces TXN and TYM exists a mutual capacitor 30. FIG. 30 is a timing diagram of the available switches SW2-SW3 and SW6-SW8 shown in FIG. 29, and FIGS. 31 and 32 are the equivalent circuits of the detector 130 in the second mode during time phases T5 and T6, respectively.

Figure 31:
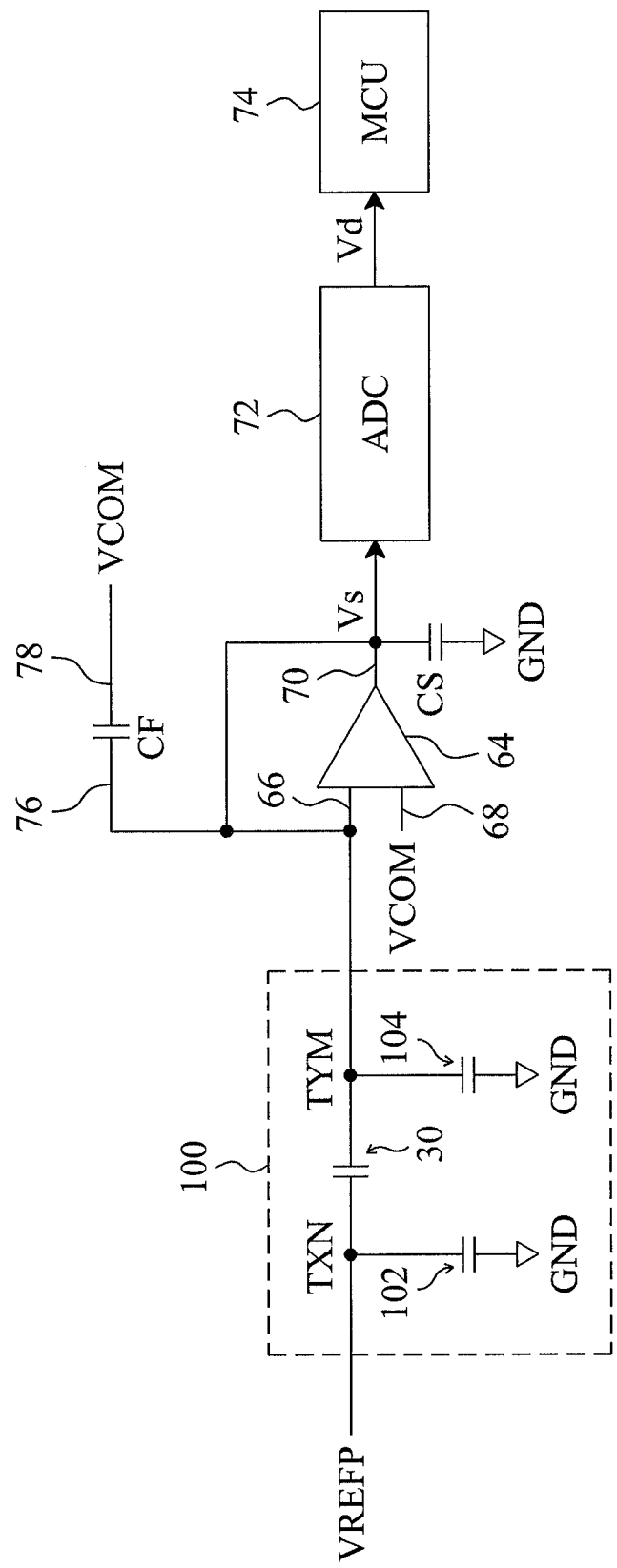
FIG. 31 is the equivalent circuit of the detector shown in FIG. 29 during the first time phase shown in FIG. 30.
Figure 32:
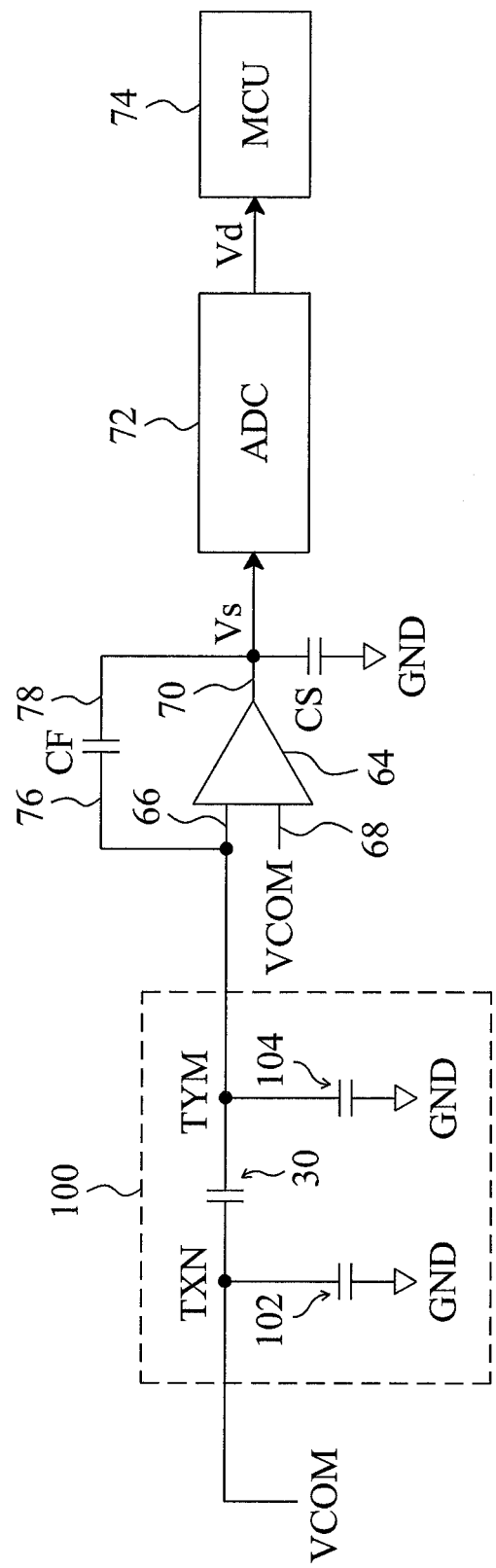
FIG. 32 is the equivalent circuit of the detector shown in FIG. 29 during the second time phase shown in FIG. 30.

Referring to FIGS. 30 and 31, during the time phase T5, the switches SW2, SW6 and SW8 are closed and the switches SW3 and SW7 are opened, so that the voltage source VREFP is connected to the capacitance sensor trace TXN to charge the mutual capacitor 30, the input terminal 66 of the operational amplifier 64 is connected to the output terminal 70, and the terminal 78 of the gain control capacitor array CF is connected to the voltage source VCOM. Due to the virtual short circuit between the input terminals 66 and 68 of the operational amplifier 64, the voltage on the input terminal 66 of the operational amplifier 64 is VCOM, the terminals 76 and 78 of the gain control capacitor array CF are at an equal voltage VCOM, and the charge stored in the gain control capacitor array CF is zero accordingly. Referring to FIGS. 30 and 32, during the time phase T6, the switches SW3 and SW7 are closed and the switches SW2, SW6 and SW8 are opened, so that the capacitance sensor trace TXN is connected to the voltage source VCOM, and the terminal 78 of the gain control capacitor array CF is connected to the output terminal 70 of the operational amplifier 64. Due to the virtual short circuit between the input terminals 66 and 68 of the operational amplifier 64, the capacitance sensor traces TXN and TYM are at an equal voltage VCOM, and the charge stored in the mutual capacitor 30 will be transferred to the gain control capacitor array CF in generation of the sense signal Vs. As described above, when the intersection of the capacitance sensor traces TXN and TYM is touched, the mutual capacitor 30 will have a capacitance increment, so that the sense signal Vs obtained during the time phase T6 is different, as shown in the equations Eq-23 and Eq-26. After the sense signal Vs is converted into the digital signal Vd by the ADC 72, the MCU 74 may easily identify whether the intersection of the capacitance sensor traces TXN and TYM is touched according to the magnitude of the digital signal Vd.

Figure 33:
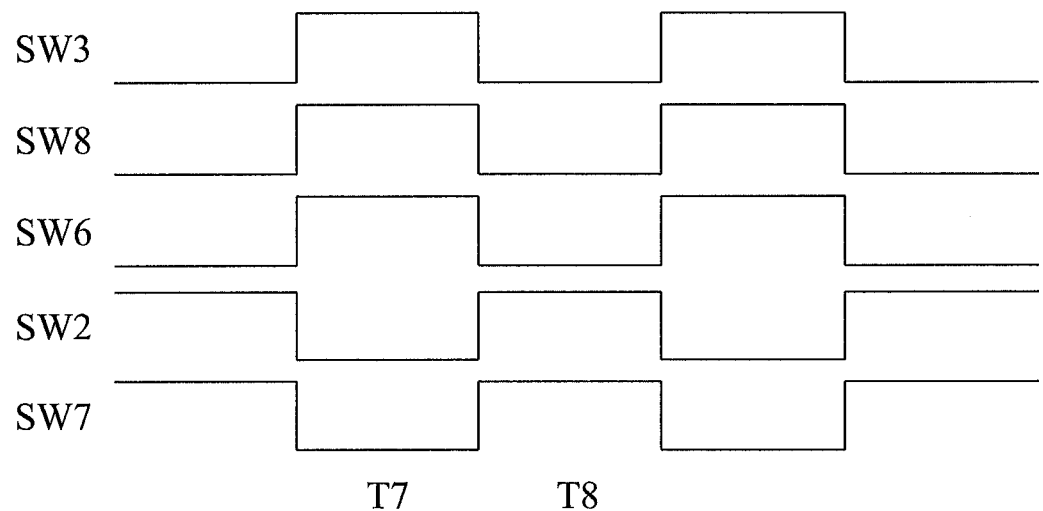
FIG. 33 is another timing diagram of the available switches shown in FIG. 29.
Figure 34:
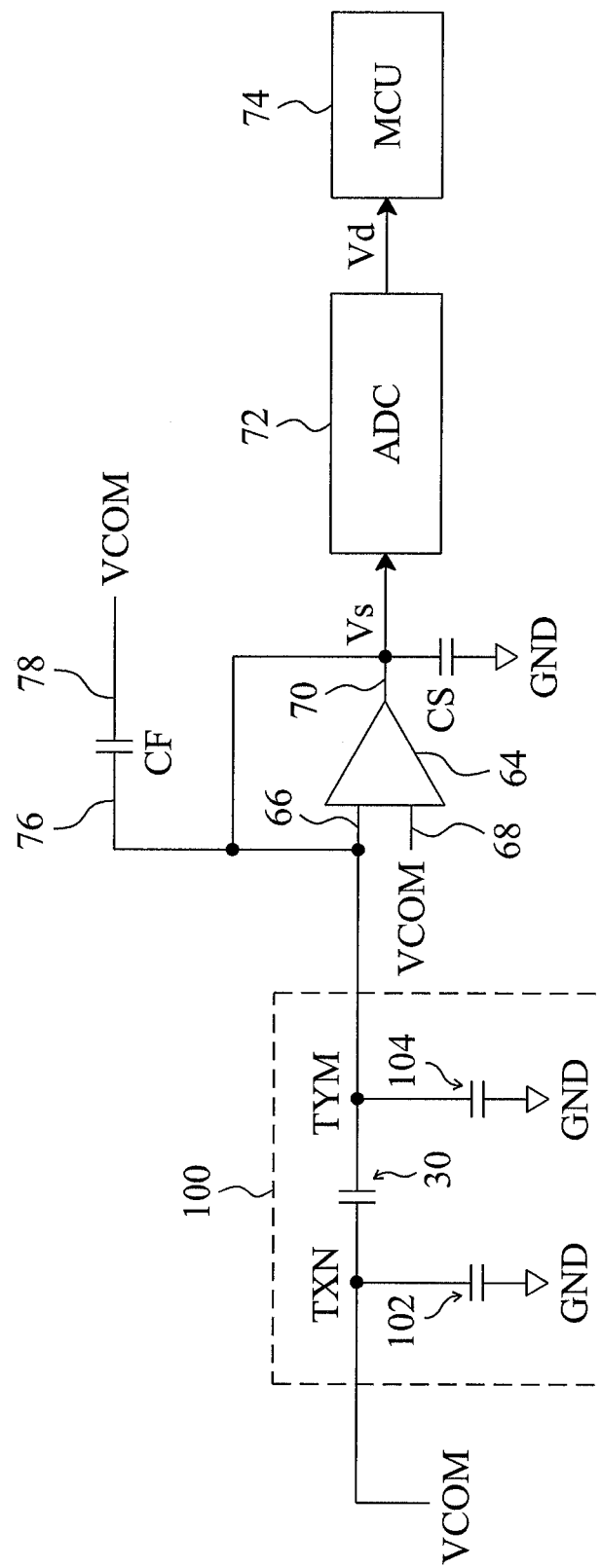
FIG. 34 is the equivalent circuit of the detector shown in FIG. 32 during the first time phase shown in FIG. 33.
Figure 35:
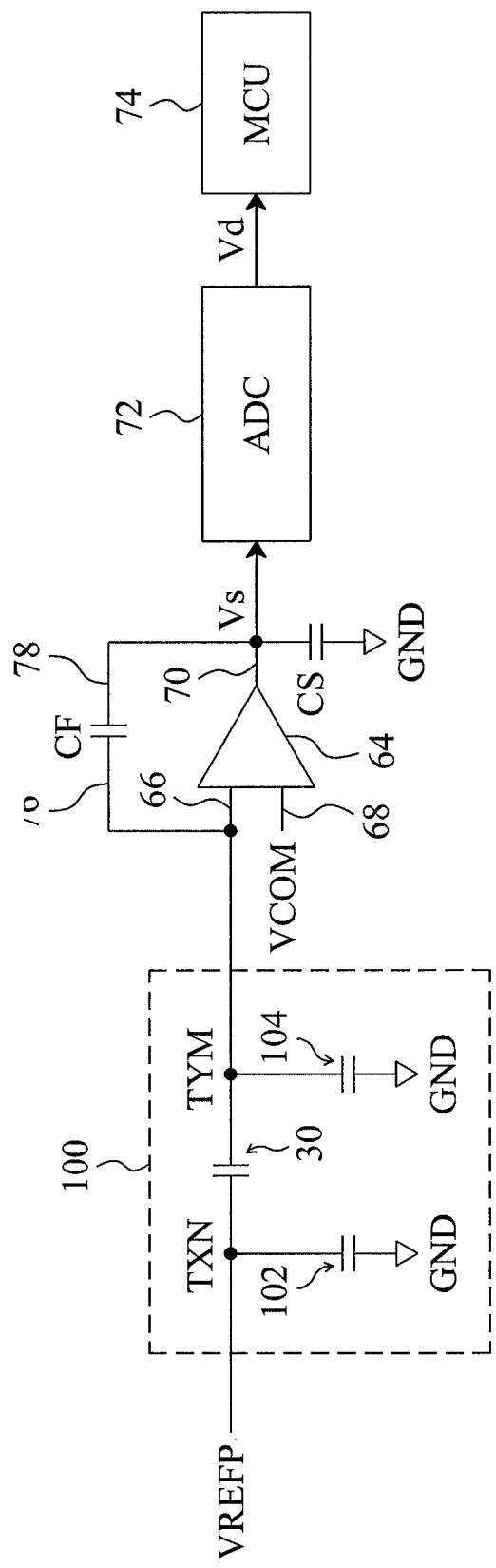
FIG. 35 is the equivalent circuit of the detector shown in FIG. 32 during the first time phase shown in FIG. 33.

FIG. 33 is another timing diagram of the available switches SW2-SW3 and SW6-SW8 shown in FIG. 29, and FIGS. 34 and 35 are the equivalent circuits of the detector 130 in the second mode during time phases T7 and T8, respectively. Referring to FIGS. 33 and 34, during the time phase T7, the switches SW3, SW6 and SW8 are closed and the switches SW2 and SW7 are opened, so that the voltage source VCOM is connected to the capacitance sensor trace TXN, the input terminal 66 of the operational amplifier 64 is connected to the output terminal 70, and the terminal 78 of the gain control capacitor array CF is connected to the voltage source VCOM. Due to the virtual short circuit between the input terminals 66 and 68 of the operational amplifier 64, the voltage on the input terminal 66 of the operational amplifier 64 is VCOM, the terminals TXN and TYM of the mutual capacitor 30 and the terminals 76 and 78 of the gain control capacitor array CF are all at an equal voltage VCOM and therefore, the charge stored in the mutual capacitor 30 and that stored in the gain control capacitor array CF are both zero. Referring to FIGS. 33 and 35, during the time phase T8, the switches SW2 and SW7 are closed and the switches SW3, SW6 and SW8 are opened, so that the capacitance sensor trace TXN is connected to the voltage source VREFP, and the terminal 78 of the gain control capacitor array CF is connected to the output terminal 70 of the operational amplifier 64. Due to the law of charge conservation, the voltage on the terminal 78 of the gain control capacitor array CF occurs a variation, i.e., the sense signal Vs occurs a variation. As described above, when the intersection of the capacitance sensor traces TXN and TYM is touched, the mutual capacitor 30 will have a capacitance increment, so that the sense signal Vs obtained during the time phase T8 will be different, as shown in the equations Eq-29 and Eq-30. After the sense signal Vs is converted into the digital signal Vd by the ADC 72, the MCU 74 may easily identify whether the intersection of the capacitance sensor traces TXN and TYM is touched according to the magnitude of the digital signal Vd.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A detection method for a capacitive touchpad including a plurality of capacitance sensor traces, the detection method comprising the steps of:
   (A) detecting self capacitances from the plurality of capacitance sensor traces for identifying any touch point on the capacitive touchpad; and
   (B) if a plurality of touch points are detected in the step (A), detecting a mutual capacitance at one of the plurality of touch points for identifying whether it is a real touch point;
   wherein the step (A) comprises the steps of:
      applying a first voltage to charge a detected capacitance sensor trace selected from the plurality of capacitance sensor traces:
      setting a voltage across a gain control capacitor array:
      connecting the detected capacitance sensor trace to a first terminal of the gain control capacitor array under compensating the self capacitor of the detected capacitance sensor trace;
      extracting a first sense signal from a second terminal of the gain control capacitor array;
      applying a second voltage to charge the detected capacitance sensor trace, wherein a voltage difference between the first voltage and a voltage on the first terminal of the gain control capacitor array, and a voltage difference between the second voltage and the voltage on the first terminal of the gain control capacitor array, are equal in magnitude but opposite in polarity;
      resetting the voltage across the gain control capacitor array;
      connecting the detected capacitance sensor trace to the first terminal of the gain control capacitor array under compensating the self capacitor of the detected capacitance sensor trace;
      extracting a second sense signal from the second terminal of the gain control capacitor array; and
      extracting an average from the first and second sense signals to determine whether the detected capacitance sensor trace has a touch point thereon.

2. The detection method of claim 1, wherein each touch point detected from the step (A) is at an intersection of two of the plurality of capacitance sensor traces.

3. A detection method for a capacitive touchpad including a plurality of capacitance sensor traces, the detection method comprising the steps of:
   (A) detecting self capacitances from the plurality of capacitance sensor traces;
   (B) detecting mutual capacitances at intersections of the plurality of capacitance sensor traces; and
   (C) identifying a touch point according to the self capacitances and the mutual capacitances;
   wherein the step (B) comprises the steps of:

(a) during a first time phase, setting a voltage across a mutual capacitor between two of the plurality of capacitance sensor traces, and a voltage across a capacitor array; and (b) during a second time phase, switching the voltage on one of the two capacitance sensor traces from a first voltage to a second voltage and connecting the other of the two capacitance sensor traces to a first terminal of the capacitor array, to thereby cause a variation of the voltage on a second terminal of the capacitor array.

4. The detection method of claim 3, wherein the step (a) comprises the step of applying a third voltage to the first and second terminals of the capacitor array for setting the voltage across the capacitor array.

5. The detection method of claim 4, wherein the third voltage is equal to the second voltage.

6. The detection method of claim 5, wherein the step (b) comprises the steps of:

applying the second voltage to a first input terminal of an operational amplifier;

connecting the other of the two capacitance sensor traces and the first terminal of the capacitor array to a second input terminal of the operational amplifier; and connecting the second terminal of the capacitor array to an output terminal of the operational amplifier.

7. The detection method of claim 4, wherein the third voltage is equal to the first voltage.

8. The detection method of claim 7, wherein the step (b) comprises the steps of:

applying the first voltage to a first input terminal an operational amplifier;

connecting the other of the two capacitance sensor traces and the first terminal of the capacitor array to a second input terminal of the operational amplifier; and connecting the second terminal of the capacitor array to an output terminal of the operational amplifier.

9. A detector for a capacitive touchpad including two capacitance sensor traces which have a mutual capacitor therebetween at an intersection thereof, the detector comprising:

a self negative capacitance compensator for compensating a self capacitor of a first one of the two capacitance sensor traces;

a first switch connected between the self negative capacitance compensator and the first capacitance sensor trace;

a switching circuit connected to the first capacitance sensor trace for applying one of a plurality of supply voltages to the first capacitance sensor trace;

a mode switching device connected to the two capacitance sensor traces;

a second switch connected between the first capacitance sensor trace and the mode switching device; and a sensing circuit connected to the mode switching device, for detecting the self capacitance of the first capacitance sensor trace or the mutual capacitance at the intersection, to thereby generate a sense signal;

wherein the mode switching device connects the first capacitance sensor trace to the sensing circuit in a first mode to detect a variation of the self capacitance from the first capacitance sensor trace, and connects the second capacitance sensor trace to the sensing circuit in a second mode to detect a variation of the mutual capacitance at the intersection.

10. The detector of claim 9, wherein the sensing circuit comprises:

an operational amplifier having a first input terminal to receive a second one of the plurality of supply voltages, a second input terminal connected to the mode switching device, and an output terminal to provide the sense signal;

a third switch connected between the second input terminal and the output terminal of the operational amplifier;

a first capacitor array connected between the second input terminal and the output terminal of the operational amplifier; and a second capacitor array connected to the output terminal of the operational amplifier for storing the sense signal.

11. The detector of claim 10, wherein the switching circuit comprises:

a fourth switch connected between the first capacitance sensor trace and a node having a third one of the plurality of supply voltages;

a fifth switch connected between the first capacitance sensor trace and a node having a fourth one of the plurality of supply voltages; and a sixth switch connected between the first capacitance sensor trace and a node having a fifth one of the plurality of supply voltages, wherein a voltage difference between the third supply voltage and a voltage on the first input terminal of the operational amplifier, and a voltage difference between the fifth supply voltage and the voltage on the first input terminal of the operational amplifier, are equal in magnitude but opposite in polarity.

12. The detector of claim 9, wherein the sensing circuit comprises:

an operational amplifier having a first input terminal to receive a second one of the plurality of supply voltages, a second input terminal connected to the mode switching device, and an output terminal to provide the sense signal;

a third switch connected between the second input terminal and the output terminal of the operational amplifier;

a first capacitor array having a first terminal connected to the second input terminal of the operational amplifier, and a second terminal;

a second switching circuit connected to the second terminal of the first capacitor array, for connecting the second terminal of the first capacitor array to the output terminal of the operational amplifier or a node having the second supply voltage; and a second capacitor array connected to the output terminal of the operational amplifier for storing the sense signal.

13. The detector of claim 12, wherein the second switching circuit comprises:

a fourth switch connected between the second terminal of the first capacitor array and the node having the second supply voltage; and a fifth switch connected between the second terminal of the first capacitor array and the output terminal of the operational amplifier.

14. The detector of claim 9, further comprising:

an analog-to-digital converter connected to the sensing circuit, for converting the sense signal from analog to digital; and a microprocessor control unit connected to the analog-to-digital converter, for processing the digital signal.

* * * * *